US011249937B1

(12) United States Patent
Bshara et al.

(10) Patent No.: US 11,249,937 B1
(45) Date of Patent: *Feb. 15, 2022

(54) STORAGE ADAPTER DEVICE FOR COMMUNICATING WITH NETWORK STORAGE

(71) Applicant: Amazon Technologies, Inc., Seattle, WA (US)

(72) Inventors: Nafea Bshara, San Jose, CA (US); Alexander Matushevsky, Haifa (IL); Georgy Machulsky, San Jose, CA (US); Leah Shalev, Zichron Yaakov (IL); Saar Gross, Binyamina (IL)

(73) Assignee: Amazon Technologies, Inc., Seattle, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/226,529

(22) Filed: Dec. 19, 2018

Related U.S. Application Data

(63) Continuation of application No. 14/869,700, filed on Sep. 29, 2015, now Pat. No. 10,162,793.

(51) Int. Cl.
| | |
|---|---|
| *G06F 15/173* | (2006.01) |
| *H04L 29/08* | (2006.01) |
| *G06F 12/02* | (2006.01) |
| *G06F 13/42* | (2006.01) |
| *H04L 29/06* | (2006.01) |

(52) U.S. Cl.
CPC .... *G06F 15/17331* (2013.01); *G06F 12/0238* (2013.01); *G06F 13/4221* (2013.01);
(Continued)

(58) Field of Classification Search
None
See application file for complete search history.

(56) References Cited

U.S. PATENT DOCUMENTS

| | | | |
|---|---|---|---|
| 8,645,508 B1 * | 2/2014 | Dickinson | H04L 9/0643 709/220 |
| 8,958,293 B1 * | 2/2015 | Anderson | H04L 67/1002 370/230 |

(Continued)

OTHER PUBLICATIONS

"Intel® Arria® 10 Avalon®-ST Interface with SR-IOV PCIe* Solutions User Guide". Published Mar. 15, 2017. (Year: 2017).*

(Continued)

*Primary Examiner* — Scott B Christensen
(74) *Attorney, Agent, or Firm* — Weaver Austin Villeneuve & Sampson LLP

(57) ABSTRACT

Provided are systems and methods for a storage adapter device for communicating with network storage. In some implementations, the storage adapter device comprises a host interface. In these implementations, the host interface may be configured to communicate with a host device using a local bus protocol. In some implementations, the storage adapter device also includes a network interface. In these implementations, the network interface may communicate with a network using a network protocol. In some implementations, the storage adapter device may be configured to communicate with a remote storage device. In some implementations, the storage adapter device may also be configured to translate a request from the host interface from the local bus protocol to the network protocol. The storage adapter device may further be configured to transmit the translated request to the remote storage device.

12 Claims, 13 Drawing Sheets

(52) U.S. Cl.
CPC ...... *G06F 13/4234* (2013.01); *G06F 13/4282* (2013.01); *H04L 67/1097* (2013.01); *H04L 69/16* (2013.01); *G06F 2212/7201* (2013.01)

(56) References Cited

U.S. PATENT DOCUMENTS

| | | | |
|---|---|---|---|
| 9,804,988 B1 * | 10/2017 | Ayoub | G06F 13/4022 |
| 10,075,524 B1 | 9/2018 | Bshara et al. | |
| 10,162,793 B1 | 12/2018 | Bshara et al. | |
| 2004/0233910 A1 | 11/2004 | Chen et al. | |
| 2015/0006663 A1 | 1/2015 | Huang | |
| 2015/0029848 A1 * | 1/2015 | Jain | H04L 47/125 370/235 |

OTHER PUBLICATIONS 13.2. Using SR-IOV. Posted at https://docs.fedoraproject.org/en-US/Fedora_Draft_Documentation/0.1/html/Virtualization_Deployment_and_Administration_Guide/sect-Virtualization_Host_Configuration_and_Guest_Installation_Guide-SR_IOV-How_SR_IOV_Libvirt_Works.html on Sep. 25, 2014. (Year: 2014).*

U.S. Appl. No. 14/869,700, "Final Office Action", dated Jan. 19, 2018, 15 pages.

U.S. Appl. No. 14/869,700, "Non-Final Office Action", dated Jun. 15, 2017, 13 pages.

U.S. Appl. No. 14/869,700, "Notice of Allowance", dated Aug. 15, 2018, 14 pages.

U.S. Appl. No. 14/869,700, "Notice of Allowance", dated May 21, 2018, 19 Pages.

U.S. Appl. No. 14/869,700, "U.S. Patent Application", Storage Adapter Device for Communicating With Network Storage, Sep. 29, 2015.

U.S. Appl. No. 14/869,778, "U.S. Patent Application", Storage Bridge Device for Communication With Network Storage, Sep. 29, 2015.

Kay, "Storage Virtualization", Available Online at: https://www.computerworld.com/article/2551439/data-center/storage-virtualization.html, Oct. 6, 2008.

* cited by examiner

STORAGE ADAPTER DEVICE FOR COMMUNICATING WITH NETWORK STORAGE

CROSS REFERENCE TO RELATED APPLICATIONS

This application is a continuation of U.S. patent application Ser. No. 14/869,700, filed Sep. 29, 2015, issued as U.S. Pat. No. 10,162,793 on Dec. 25, 2018, and titled "STORAGE ADAPTER DEVICE FOR COMMUNICATING WITH NETWORK STORAGE", the content of which is incorporated herein by reference in its entirety.

BACKGROUND

Server computers often communicate with different local and remote storage devices for various purposes. For example, server computers may use storage devices for storing data, archiving, databasing, warehousing, data processing, and so on. Generally, operating systems executing on server computers access local and remote storage devices using device drivers. In many cases, operating systems execute different device drivers to support the different storage protocols supported by local storage devices. For example, an operating system may use a device driver that implements a Serial Advanced Technology Attachment (SATA) or an Advanced Host Controller Interface (AHCI) driver to communicate with a SATA-based storage device. As another example, an operating system may use a device driver that implements a Non-Volatile Memory Express (NVMe) driver to communicate with a Solid State Drive (SSD) over a Peripheral Component Interconnect Express (PCIe) interconnect. Standards such as SATA, AHCI, NVMe, and PCIe provide a framework for developing commonly available storage device drivers. Such storage device drivers may be readily available, and allow a server computer to quickly and easily access local storage devices.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Server computers often communicate with different local and remote storage devices for various purposes. For example, server computers may use storage devices for storing data, archiving, databasing, warehousing, data processing, and so on. Generally, operating systems executing on server computers access local and remote storage devices using device drivers. In many cases, operating systems execute different device drivers to support the different storage protocols supported by local storage devices.

In most implementations, however, storage device drivers only provide communication with local storage devices. In some cases, it may be desirable for a server computer to have access to remote storage devices. For example, remote storage devices may provide more capacity than may be possible with only local storage devices. As another example, remote storage devices, which in most cases are connected to a network, may be more easily shared. This is because any server computer that is connected to the network and that is granted access to the remote storage devices may communicate with the remote storage devices.

Server computing systems may provide access to remote storage devices using a network card and a storage-to-network-translation mechanism. Storage-to-network translations may not be as readily available as storage device drivers. Storage-to-network translation may typically be done in a server's operating system.

An alternate solution is disclosed herein. The systems and methods disclosed herein provide a storage adapter device that includes a host interface and a network interface. The host interface is configured to communicate with a host device, using a local bus protocol. The network interface is configured to communicate with a network, using a network protocol. In various implementations, the storage adapter device may be able to accept, from the host device, read and write transactions directed to remote storage devices. The storage adapter device may further be configured to translate the read and write transactions from the local bus protocol to the network protocol. The storage adapter device may further transmit the translated transactions over the network and to the remote storage devices.

Figure 1:
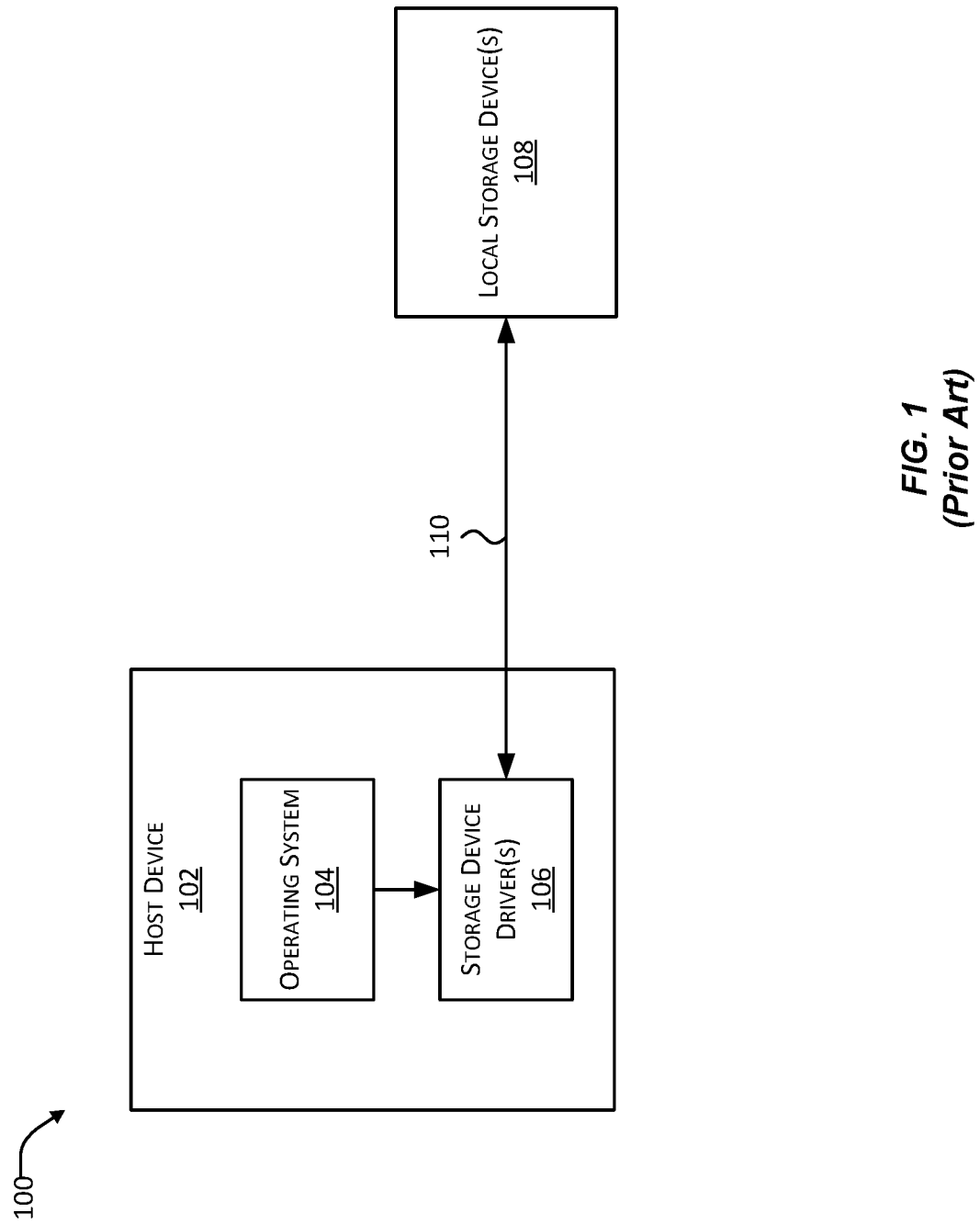
FIG. 1 illustrates an example of a computing system that includes a host device in communication with one or more local storage devices.

Computing systems may include one or more peripheral devices, such as storage devices. FIG. 1 illustrates an example of a computing system 100 that includes a host device 102 in communication with one or more local storage devices 108. The computing system 100 may include other peripheral devices, such as printers, displays, scanners, and so on. The host device 102 may be in communication with the local storage devices 108 over a communication medium 110.

The host device 102 may be a computer, such as a server computer, a desktop computer, a laptop, a distributed computing system, or the like. The host device 102 may originate Input/Output (I/O) transactions to peripheral devices, such as the local storage devices 108. I/O transactions include data reads and data writes. The host device 102 of this example includes an operating system 104 and device drivers, including storage device drivers 106. The operating system 104 is software that manages the host device's 102 hardware and software resources. The operating system 104 may also manage applications running on the host device 102. Examples of operating systems include Windows®, Linux, iOS®, and similar commercial operating systems. The operating system 104 may also be a proprietary operating system.

Device drivers are software or a combination of software and hardware that enables communication with peripheral devices, such as the local storage devices 108. A device driver may control a particular type of device. For example, one device driver may control a printer, while another device driver may control a display. The host device 102 in this example includes one or more storage device drivers 106 for communicating with the one or more local storage devices 108. In most cases, a device driver converts general I/O instructions from the operating system 104 into messages that can be understood by the peripheral device. In many cases, a device driver may implement a standardized bus protocol. In such cases, the device driver may be able to communicate with any peripheral device that implements the same standardized bus protocol. For example, the host device 102 may include a storage device driver that implements Non-Volatile Memory Express (NVMe, also referred to as Non-Volatile Memory Host Controller Interface, or NVMHCI). Using this NVMe device driver, the host device 102 may be able to communicate with any local storage device that includes an NVMe interface. In some cases, a device driver may implement a standard protocol, such as Universal Serial Bus (USB), but also include components that are specific to a peripheral device manufacturer (e.g., a USB printer manufactured by Hewlett Packard™). In such cases, a device driver that is specific to the device may be preferable over a generic device driver.

The storage device drivers 106 of this example communicate with the local storage devices 108 over a communication medium 110. This communication medium 110 may be a physical cable, a printed circuit board, or a combination of cables and circuit boards. In many cases, the communication medium 110 is also standardized, where the standard provides, for example, the number of wires, the shape of any connectors, power requirements, and so on. In such cases, the communication medium 110 may be attached to any peripheral device that implements the same standard. Similarly, the communication medium 110 may also be attached to ports on the host device 102 that implement the same standard. In many cases, the communication medium 110 is specified by the protocol implemented by the storage device driver 106. The communication medium 110 may, in certain contexts, also be referred to as a bus.

The local storage devices 108 in this example may each be a non-volatile data storage device. "Non-volatile" describes storage devices that retain stored data when the device is not powered. In contrast, "volatile" storage devices retain stored data only so long as they have power. Examples of non-volatile storage devices include magnetic disk drives, optical disk drives, tape drives, solid state drives (SSD), and the like. "Local" in this context means that the local storage devices 108 are physically and directly connected to the host device 102, using only the communication medium 110, as described above. Usually the local storage devices 108 would be physically located close to the host device 102, for example in the same chassis, bench, or rack.

The local storage devices 108 may implement a standard bus protocol. The host device 102 may provide a storage device driver 106 that is able to communicate with the local storage devices 108, over the communication medium 110, using the same bus protocol. Examples of bus protocols for communication with the local storage devices 108 include NVMe, Advanced Host Controller Interface (AHCI), Small Computing System Interface (SCSI), Serial Attached SCSI (SAS), Serial Advanced Technology Attachment (SATA), and Parallel Advanced Technology Attachment (PATA), among others. Bus protocols such as these are typically used by local storage devices, and may also be referred to herein as local bus protocols or local storage protocols.

As noted above, the computing system 100 may include one or more local storage devices 108. When the computing system 100 includes more than one local storage device 108, each local storage device 108 may have its own communication medium 110 to the host device 102. Alternatively or additionally, two or more of the local storage devices 108 may share one communication medium 110. Alternatively or additionally, two or more of the local storage devices 108 may be connected in series, with additional communication mediums, with one or both ends of the chain connected to the host device 102.

The example of FIG. 1 illustrates a typical implementation for including local storage devices in a computing system. In some cases, it may be desirable to share local storage device resources with other computing systems. This may be the case, for example, when it is desirable to make data available anywhere and from any computing system, and/or when it is desirable to have centralized management of large amounts of data. Sharing local storage devices, however, may not be easily accomplished with the computing system 100 of FIG. 1. For example, bus protocols typically only allow communication between a local storage device 108 and a host device 102. For an external system to access the local storage devices 108, the host device 102 would have to provide special software to make its local storage devices 108 visible and addressable. Such software may not be sufficiently robust, and/or may be too slow to make accessing the local storage devices 108 practical.

The computing system 100 also does not provide a method to communicate with remote storage devices. It may be desirable to communicate with remote storage devices in order to expand the storage capacity of the computing system 100. While more storage devices can be added to the computing system, the number of and size of the storage devices may be subject to physical limitations, such as the number of connecters available to the host device 102, power and cooling requirements, available space, and so on. Remote storage devices, however, may provide a vast amount of storage space. Remote storage devices may also be more easily shared. The example computing system 100, however, does not include a method to communicate with remote storage devices. As noted above, the bus protocol implemented by the storage device drivers 106 and the local storage devices 108 may only be suitable for local communication.

Figure 2:
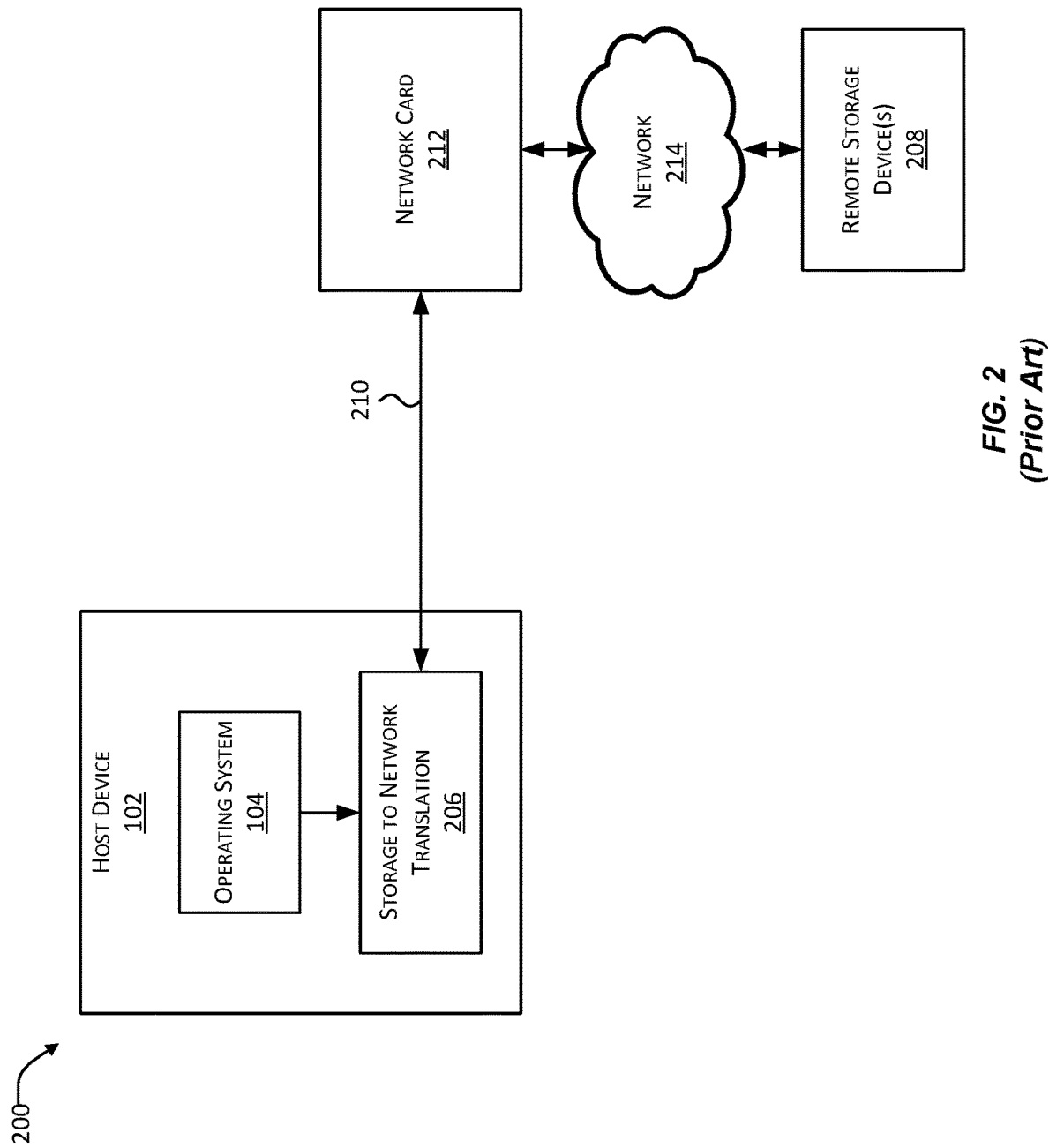
FIG. 2 illustrates an example of a computing system configured to communicate with one or more remote storage devices.

FIG. 2 illustrates an example of a computing system 200 configured to communicate with one or more remote storage devices 208. The computing system 200 in this example includes a network card 212 in communication with a network 214. Attached to the network 214 are one or more remote storage devices 208. In this example, the host device 102 of FIG. 1 communicates, as illustrated in FIG. 2, with the network card 212 by way of a storage-to-network translation module 206 and a communication medium 210.

The remote storage devices 208 are similar to the local storage devices 108 of FIG. 1, meaning that the remote storage devices 208 of FIG. 2 may be non-volatile data storage devices (e.g., magnetic drives, optical drives, tape drives, solid state drives, etc.). Similarly, the remote storage devices 208 may implement a standardized bus protocol, such as NVMe, SCSI, SAS, SATA, PATA, or the like. The remote storage devices 208 are "remote" in that they are attached to a network 214, and can be communicated with over that network 214. The remote storage devices 208 may, in some cases, by physically co-located with the host device 102 (e.g., in the same room or building), or may be physically distant from the host device 102 (e.g., in another state or country). In some cases, the remote storage devices 208 may be located in multiple locations. The remote storage devices 208 may include an interface for communicating with the network 214. In some implementations, the remote storage devices 208 may have access restrictions, such as for example, passwords, encryption, security certificates, and the like.

The remote storage devices 208 may be accessed over the network 214. In some implementations, the network 214 may be a private network. A private network is a network that may have private network addresses, be restricted or have no access to other networks, and/or may be limited to certain authorized uses. Private networks may be found, for example, in homes, offices, and enterprise networks. In other implementations, the network 214 may be a public network. A public network may be shared by multiple entities, and may have no access restrictions, or minimal access restrictions. A public network may include the Internet. In other implementations, the network 214 may include a combination of public and private networks. In some implementations, the network 214 may include multiple networks, including for example the Internet. The network 214 may include other computing systems and network infrastructure devices, such as gateway devices, routers, switches, hubs, bridges, etc.

The host device 102 may communicate with the network 214 using a network card 212. The network card 212 may communicate with the network 214 over a wired or wireless interface. For example, the network card 212 may be connected to a gateway, switch, hub, bridge, router, or a similar device using a physical cable, such as a category-5 (cat-5) or category-6 (cat-6) cable, a coaxial cable, optical fiber cable, telephone cable, or similar. Alternatively or additionally, the network card 212 may include a wireless interface configured to communicate over the air with a wireless access point. The network card 212 may implement a network protocol and communicate with the network 214 using the network protocol. Examples of network protocols include Transmission Control Protocol/Internet Protocol (TCP/IP), User Datagram Protocol/Internet Protocol (UDP/IP), Infiniband, or Remote Direct Memory Access (RDMA) over Converged Ethernet (RoCE). More particularly, as generally used herein, the network protocol can include a network storage protocol (e.g., iSCSI, NVMe-over-fabric (NVMf), or another protocol) that allows for accessing a storage device over a network. A network storage protocol may also be referred to as a storage-over-network protocol. In some implementations, the network storage protocol runs on a layer on top of the network protocol. The network card 212 may also communicate with the host device 102 using a standardized bus protocol. For example, the network card 212 may include one or more interfaces that implement any of the Peripheral Component Interconnect (PCI) family of standards, including the original PCI standard, PCI-extended (PCI-X), and PCI Express (PCIe).

The network card 212 may be connected to the host device 102 using a communication medium 210. The communication medium 210 may be a physical cable, a printed circuit board, or a combination of cables and circuit boards, connected to the host-side interface on the network card 212. The communication medium 210 may be standardized, and may implement the same standard that is implemented by the host-side interface on the network card 212. For example, the communication medium 210 may implement PCIe, and may include a PCIe slot attached to the host device 102.

The host device 102, in this example, may include a storage-to-network translation module 206 for communicating with the network card 212. The host device's 102 operating system 104 may issue I/O transactions in the same way as in the example of FIG. 1. These I/O transactions, however, may be intended for a local storage device, and thus may not be formatted for transmission over the network 214. The storage-to-network translation module 206 may provide a mechanism to translate these I/O transactions into a format suitable for transport over the network 214. For example, the storage-to-network translation module 206 may implement the Internet Small Computer System Interface (iSCSI) protocol. The iSCSI protocol encapsulates SCSI commands and assembles associated data into packets for transport over TCP/IP. On receipt at the remote storage devices 208, the packets may be disassembled back into SCSI commands.

Using the configuration of FIG. 2, the host device 102 may be able to communicate with remote storage devices 208. This configuration provides various advantages. For example, providing the remote storage devices 208 may increase the storage space available to the host device 102. The remote storage devices 208 may not be subject to the physical and capacity limitations of local storage devices. As another example, the remote storage devices may also be easier to share than local storage devices. Any computing system that is allowed to access the remote storage devices 208 may do so by connecting to the network 214.

The storage-to-network translation module 206, however, may limit the capability and flexibility of the host device 102 in accessing the remote storage devices 208. For example, the storage-to-network translation module 206 may be inefficient and affect the latency of I/O transactions. As another example, when new remote storage resources become available, the host device 102 may need to be modified to access the new remote storage devices. For example, if the host device's 102 storage-to-network translation module 206 only includes iSCSI, then the host device 102 can only communicate with remote SCSI-base storage devices. The host device 102 may not be able to communicate with, for example, NVMe-based storage devices. Furthermore, no translation modules may be readily available, as is the case with device drivers, and thus the host device 102 may require special software in order to communicate with available remote storage devices.

It may be desirable for remote storage devices to be accessible in a more flexible, efficient, robust, and simple way. For example, a computing system may be configured without a limited storage-to-network translation module. The computing system may, instead, be configured with existing device drivers. Furthermore, the computing system may be able to communicate with remote storage devices in a similar way as when communicating with local storage devices. A storage adapter device may provide the connectivity and translation that may make such a computing system possible.

I. Storage Adapter Device for Communicating with Remote Storage Devices

Figure 3:
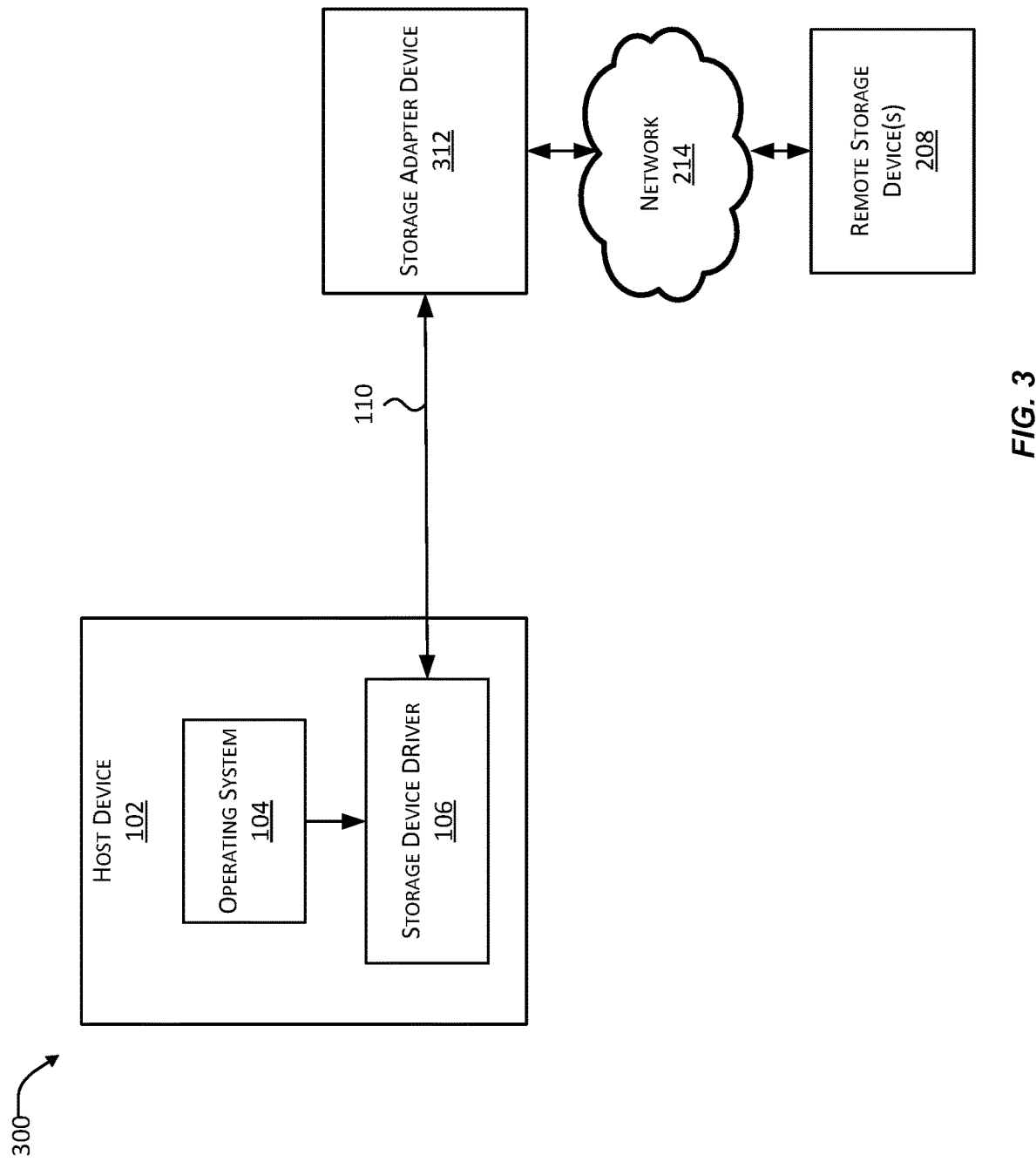
FIG. 3 illustrates an example of a computing system configured to communicate with remote storage devices, using a storage adapter device.

FIG. 3 illustrates an example of a computing system 300 configured to communicate with remote storage devices 208, using a storage adapter device 312. The computing system 300 is similar to the computing system 200 of FIG. 2, but instead of a network card 212, the host device in FIG. 3 communicates with the network 214, and through the network 214 with the remote storage devices 208, through the storage adapter device 312. The computing system 300 may still include a network card for communicating with the network 214 for other purposes.

The example computing system 300 illustrated in FIG. 3 includes the one or more remote storage devices 208 and network 214 illustrated in the example of FIG. 2. Thus in FIG. 3, the remote storage devices 208 may be non-volatile data storage devices, such as magnetic drives, optical drives, tape drives, and/or solid state drives, with an interface for communicating with the network 214. The network 214 may be a private or public network, or a combination of networks, and/or a combination of many networks, including for example the Internet. The remote storage devices 208 may be accessible over the network 214.

The storage adapter device 312 may be configured to communicate with the remote storage devices 208. The storage adapter device 312 may include a wired and/or wireless interface for communicating with the network 214. For example, the network card 212 may be connected to a gateway, switch, hub, bridge, router, or a similar device using a physical cable, such as a cat-5, cat-6, coaxial, optical fiber, or telephone cable, or a similar physical medium. Alternatively or additionally, the storage adapter device 312 may include a wireless interface configured to communicate with a wireless access point. The storage adapter device 312 may implement a network protocol (including, for example, a storage-over-the-network protocol) and communicate with the network 214 using this protocol. Examples of network protocols include TCP/IP, UDP/IP, Infiniband, and RoCE, among others. Examples of storage-over-the-network protocols include iSCSI, iSER, SRP, and NVMf, among others. The storage adapter device 312 may communicate with the host device 102 using a standardized local bus protocol. For example, the storage adapter device 312 may include one or more interfaces that implement any of the PCI family of bus standards, SCSI, SAS, SATA, PATA, or the like.

In some implementations, the storage adapter device 312 may be configured to communicate with one or more local storage devices (not illustrated) in addition to remote storage devices 208. In these implementations, the storage adapter device 312 may include a local bus interface for communicating with local storage devices. The local bus interface may implement a local storage protocol, such as for example any of the PCI family of bus standards, SCSI, SAS, SATA, PATA, or the like. Furthermore, in these implementations, the storage adapter device 312 may include a directory or mapping of transactions that may be directed to the local storage devices, and transactions that may be directed to the remote storage devices 208. In some cases, a transaction may be directed to both local storage devices and remote storage devices.

In some implementations, the storage adapter device 312 includes an NVMe interface for communicating with the host device 102. NVMe is a specification that builds upon the capabilities of PCIe. NVMe enables high-speed communication, for example with storage devices. NVMe-based devices communicate using the PCIe protocol. NVMe is commonly used with solid state drives.

In some implementations, the storage adapter device 312 may also be called a host bus adapter (HBA). A host bus adapter is a circuit board and/or integrated circuit adapter that provides I/O processing and physical connectivity between a host device and storage and/or network devices. In some cases, an HBA may relieve the host device of both data storage and retrieval tasks, and thus may improve the overall performance of the system. In many cases, an HBA connects to a host device using PCIe. HBAs may implement any number of interconnects. In many cases, HBAs are commonly used with storage protocols, such as Fiber Channel and SAS.

The computing system 300 further includes the host device 102, as illustrated in FIG. 1. Thus the host device 102 of FIG. 3 may be a server computer, a desktop computer, a laptop, a distributed computing system, or the like. The host device 102 may originate I/O transactions to the remote storage devices 208. As in FIG. 1, the host device 102 of FIG. 3 may include an operating system 104, one or more device drivers, including storage device drivers 106, and a communication medium 110. The operating system 104 may manage the host device's 102 hardware and software resources. The operating system 104 may be in communication with the storage device drivers 106. The storage device drivers 106 may convert general I/O transactions from the operation system 104 into messages that can be understood by storage devices. In many cases, the storage device drivers 106 implement standard local bus protocols, such as NVMe, AHCI, SCSI, SAS, SATA, PATA, or the like. The communication medium 110 may also, in many cases, implement a standard local bus protocol, typically similar to the bus protocol implement by an associated storage device driver 106. The communication medium 110 may provide connectivity and a communication channel with one or more storage devices. The communication medium 110 may be a physical cable, printed circuit board, or a combination of cables and circuit boards.

Though described above as possibly connected to local storage devices, the communication medium 110 in this example is connected to the storage adapter device 312. As noted above, the storage adapter device 312 may include an interface that implements a local bus protocol. The host device 102 may communicate with the storage adapter device 312 using a storage device driver 106 in communication with this local bus interface, using the communication medium 110.

In this configuration, the storage adapter device 312 may provide a method for the host device 102 to communicate with the remote storage devices 208. The host device's 102 operating system 104 may generate I/O transactions that are received by one or more storage device drivers 106. The storage device drivers 106 may transmit the I/O transactions over the communication medium 110, as if communicating with a local storage device. The storage adapter device 312 may accept the I/O transactions in the same way that a local storage device would. The storage adapter device 312, however, may repackage the I/O transactions, and transmit them over the network 214 to the remote storage devices 208. The storage adapter device 312 may further accept responses (such as acknowledgements or read data) from the remote storage devices (by way of the network 214). The storage adapter device 312 may transmit these responses over the communication medium 110 to the storage device drivers 106, just as would a local storage device.

In some cases, the storage adapter device 312 may be in communication with multiple remote storage devices 208. In these cases, the storage adapter device 312 may select a remote storage device from among the multiple storage devices 208 to receive an I/O transaction. This selection may be based on a table, list, database, or other tracking method that maps local storage device addresses to remote storage device addresses. For example, the mapping may indicate that all of the addresses for one local storage device are mapped to one of multiple remote storage devices. Alternatively or additionally, the mapping may indicate that the addresses for one local storage device are mapped to one namespace or partition on a remote storage device. Alternatively or additionally, the mapping may indicate that portions of the addresses for one local storage device are spread among multiple remote storage devices. Also alternatively or additionally, some or all of the addresses for one local storage device may be mapped to more than one remote storage device.

The mapping can be stored in persistent memory or in volatile memory. Persistent memory includes memory capable of retaining information when not powered. Volatile memory includes memory that require power in order to retain information. In some implementations, the mapping is updated periodically or on-demand by another component, possibly by an external service. In some cases, the external service is a central entity that provides mapping information for one or more systems.

In some implementations, one or more of the multiple remote storage devices 208 may, upon receiving and completing a transaction, generate a response to the transaction. For example, in some cases, the multiple remote storage devices 208 may be configured to indicate that the transactions completed successfully. In these cases, a remote storage device 208 that has completed a transaction may generate a response. The response may be transmitted over the network 214 to the storage adapter device 312. The storage adapter device 312 may translate the response from a network protocol to the local bus protocol. The storage adapter device 312 may then transmit the translated response to the host device 102, so that the host device 102 may be informed that the transaction has completed. In some cases, the multiple remote storage devices 208 may be configured to generate a response when a transaction did not complete successfully. In these cases, the response may include information about why the transaction did not complete successfully. These responses may also be translated by the storage adapter device 312.

The example computing system 300 of FIG. 3 provides several advantages. First, as illustrated in FIG. 3, the host device 102 may be able to use standard, possibly off-the-shelf storage device drivers. The host device 102 in this example may not need a complicated storage-to-network translation mechanism. This translation may be handled more efficiently and flexibly by the storage adapter device 312. Furthermore, the computing system 300 may use high-speed interconnects for the communication medium 110, such as NVMe-over-PCIe. Additionally, the host device 102 may be able to communicate with the remote storage devices 208 as if it is communicating with local storage devices. This may simplify the requirements on the host device 102 significantly.

Figure 4:
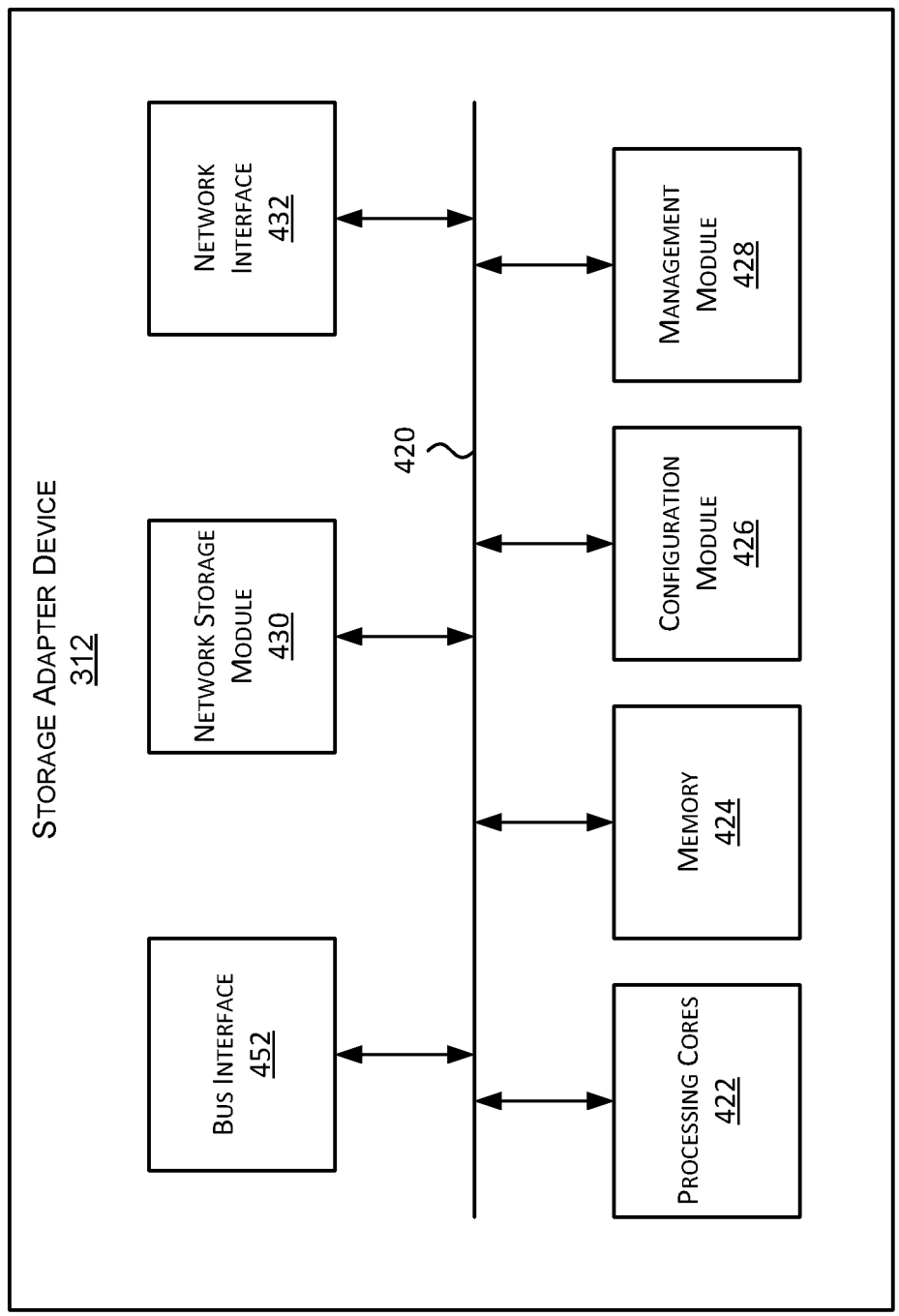
FIG. 4 illustrates in greater detail an example of the storage adapter device.

FIG. 4 illustrates in greater detail an example of the storage adapter device 312. In this example, the storage adapter device 312 may include processing cores 422, memory 424, a configuration module 426, a management module 428, a network interface module 432, a bus interface module 452, and a network storage module 430. These modules may be hardware modules, software modules, or a combination of hardware and software. The storage adapter device 312 may include additional modules, not illustrated here. In some implementations, the storage adapter device 312 may include fewer modules.

One or more of the modules may be in communication with each other over a communication channel 420. The communication channel 420 may include one or more busses, meshes, matrices, fabrics, a combination of these communication channels, or some other suitable communication channel.

The processing cores 422 may include one or more processors configured to execute instructions. Examples of processors that may be included in the processing cores 422 include ARM's cortex A57, MIPS, AMD Phenom, Intel ATOM, and so on. In some implementations, the processors of the processing cores 422 may share certain resources, such as for example busses, level 1 (L1) caches, and/or level 2 (L2) caches. The instructions executed by the processing cores 422 may be stored on a computer-readable storage medium, for example, in the form of a computer program. The computer-readable storage medium may be non-transitory. In some cases, the computer readable medium may be part of the memory 424.

The memory 424 may include either volatile or non-volatile, or both volatile and non-volatile types of memory. The memory 424 may, for example, include random access memory (RAM), read only memory (ROM), Electrically Erasable Programmable Read-Only Memory (EEPROM), flash memory, and/or some other suitable storage media. In some cases, some or all of the memory 424 may be internal to the storage adapter device 312, while in other cases some or all of the memory may be external to the storage adapter device 312.

The configuration module 426 may include one or more configuration registers. Configuration registers may control the operations of the storage adapter device 312. In some implementations, one or more bits in the configuration register can represent certain capabilities of the storage adapter device 312. Configuration registers may be programmed by instructions executing in the processing cores 422, and/or by an external entity, such as the operating system 104. The configuration module 426 may further include hardware and/or software that control the operations of the storage adapter device 312.

In some implementations, the management module 428 may be configured to manage different components of the storage adapter device 312. In some cases, the management module 428 may configure one or more bits in one or more configuration registers at power up, to enable or disable certain capabilities of the storage adapter device 312.

The network interface 432 may include hardware and/or software for communicating with a network. This network interface 432 may, for example, include physical connectors for wired connection to the network, and/or antennas for wireless communication to the network. The network interface 432 may further include hardware and/or software configured to implement a network protocol stack. The network interface 432 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), among others. The network interface 432 may alternatively or additionally communicate with the network using a network storage protocol, such as for example iSCSI, iSER, SRP, and/or NVMf, among others.

The bus interface 452 module may enable communication with a host device over a communication medium. The bus interface 452 module may include a physical interface for connecting to a cable, socket, port, or other connection to the communication medium. The bus interface 452 module may further include hardware and/or software to manage incoming and outgoing transactions. The bus interface 452 module may implement a local bus protocol, such as NVMe, AHCI, SCSI, SAS, SATA, PATA, and the like. The bus interface 452 module may include at least the physical layer for any of these bus protocols, including a connector, power management, error handling, etc. In some implementations, the bus interface 452 module may include one or more interfaces for communicating with local storage devices. These interfaces may include additional physical interfaces that may be connected to one or more local storage devices. In some cases, one or more local storage devices may share an interface with the hos device.

The network storage module 430 may be configured to communicate with one or remote storage devices. The network storage module 430 may enable data storage, data archiving, data processing, data analysis, access to web services, and the like over a network. The network storage module 430 is described in further detail below.

In some implementations, the storage adapter device 312 is a PCI device. In these implementations, the storage adapter device 312 includes a PCI interface for communicating with a host device. The term "PCI" may be used to describe any protocol in the PCI family of bus protocols, including the original PCI standard, PCI-X, AGP, and PCIe. The PCI protocols are standard bus protocols for connecting local peripheral devices to host devices. A standardized bus protocol is a data transfer protocol for which a specification has been defined and adopted by various manufacturers. Manufacturers ensure that compliant devices are compatible with computing systems implementing the bus protocol, and vice versa.

A PCI device may include one or more functions. A "function" describes operations that may be provided by the storage adapter device 312. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources. In some implementations, a PCI device may have up to eight functions.

In some implementations, the storage adapter device 312 may include single-root I/O virtualization (SR-IOV). SR-IOV is an extended capability that may be included in a PCI device. SR-IO allows a physical resource (e.g., a single network interface controller) to appear as multiple resources (e.g., sixty-four network interface controllers). Thus, a storage adapter device providing a certain functionality may appear to be multiple devices providing the same functionality. The functions of a SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with the physical function. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

Figure 5:
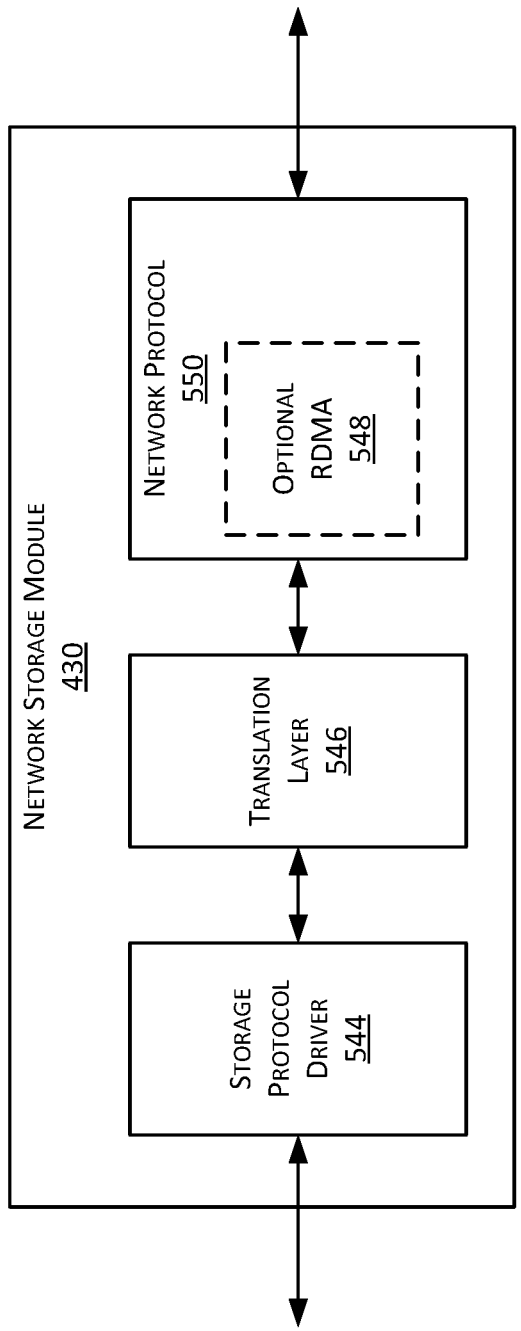
FIG. 5 illustrates, in greater detail, an example of the network storage module.

As noted above, the storage adapter device 312 may include a network storage module 430. FIG. 5 illustrates, in greater detail, an example of the network storage module 430. As illustrated in the example of FIG. 5, the network storage module 430 may include a storage protocol driver 544 module, a translation layer 546 module, an optional Remote Direct Memory Access (RDMA) 548 module, and a network protocol 550 module. Each of these modules may be implemented in hardware or software, or in a combination of hardware and software. In some implementations, two or more of the illustrated modules may be combined into one module.

The storage protocol driver 544 module may include software and/or hardware to implement the higher level operations of a bus protocol. For example, the storage protocol driver 544 module may perform operations such as unpacking incoming transactions into basic parts (such as an address and, optionally, data, byte enables, transaction attributes, etc.). The storage protocol driver 544 module may further package outgoing responses for transmitting through the bus interface 452 module to the host device. In some implementations, the storage protocol driver 544 module and the bus interface 452 module may be combined into a single module.

The translation layer 546 module may include hardware and/or software for translating transactions from the host device into transactions that can be sent over a network. For example, the translation layer 546 may translate from the bus protocol implemented by the bus interface 452 module to the network protocol implemented by the network protocol 550 module. This translation may include accepting a transaction from the storage protocol driver 544 module and packaging the transaction in a network packet. In many cases, the translation layer 546 module implements a standard translation specification, such as for example iSCSI, iSCSI Extensions to RDMA (iSER), or Storage RDMA Protocol (SRP). The translation layer 546 may further translate any responses from remote devices from a network protocol back to the local bus protocol.

In some implementations, the network storage module 430 may also include a RDMA 548 module. Direct Memory Access (DMA) provides a computing system the ability to access memory (such as host memory) directly, without the intervention of a processor. A DMA module may manage memory reads and writes, operations that would otherwise be executed by a processor. RDMA provides a computing system the ability to access memory on a remote computing system without interrupting any processors on the remote system. RDMA provides several features. For example, RDMA provides a feature called zero-copy. With zero-copy, applications running on a host device can perform data transfers without involving a network software stack. Data may be sent and received directly to memory without being copied between network layers. As another example, RDMA may provide kernel bypass. Kernel bypass may allow applications to perform data transfers directly from user space, without involving the kernel of an underlying operating system. As another example, RDMA may avoid involvement of a processor. Applications executing on a host device may access remote memory without consuming any processor time on the remote system. These features of RDMA may improve the overall performance of a computing system that is configured to access remote storage devices.

The optional RDMA 548 module may further improve the performance of the network storage module 430 in some cases. For example, the RDMA 548 module may be advantageous when a computing system implements virtualization. In this context, virtualization means to create a virtual version of the computing system. A virtualization framework may divide the computing system into one or more executing environments, often called virtual machines. Each virtual machine may execute an operating system, and may include its own memory space. Devices, applications, and human users may interact with the virtual machine as if interacting with the underlying computing system. The virtual machines, however, share the resources available in the underlying computing system, including the storage adapter device 312. Multiple virtual machines attempting to transmit through the same storage adapter device 312 may cause the latency of these transactions to be undesirably long. The RDMA 548 module may reduce these potential delays by reducing the number of processor cycles required at either the local host device or a remote device that is hosting remote storage devices. In some implementations, the RDMA 548 module may be included in the network protocol 550 module.

In some implementations, when the computing system includes virtualization, the storage adapter device 312 may include SR-IOV. For example, the storage protocol driver 544 module may include multiple physical functions and some number of virtual functions per physical function. Each virtual machine executing on the host system may be assigned to a physical function, and may transmit transactions through the network storage module 430 by sending commands to the virtual function. In other implementations, instead of including SR-IOV, the storage adapter device 312 may instead include multiple functions. For example, the storage protocol driver 544 may include two or more storage device functions. Each function may be assigned to a different virtual machine executing on the host device.

The network protocol 550 module of the network storage module 430 may enable communication with a network. The network protocol 550 module may implement a network protocol, such as for example TCP/IP, UDP/IP, Infiniband, RoCE or IEEE 802.11, or the like. The network protocol 550 module may alternatively or additionally communicate with the network using a network storage protocol, such as for example iSCSI, iSER, SRP, and NVMf, among others. The network protocol 550 module may include one or more network protocol layers, including for example one or more of an application layer, a presentation layer, a session layer, a transport layer, a network layer, a data link layer, and/or a physical layer. The network protocol 550 module may package an I/O transaction targeted to a remote storage device in a packet for transmission over a network. The network protocol 550 module may also receive any response packets from the remote storage devices, and unpack them for translation by the translation layer 546.

FIGS. 4 and 5 illustrate examples of the internal operations of the storage adapter device 312 illustrated in FIG. 3. As noted above, the storage adapter device 312 provides the host device 102 with access to remote storage devices. Remote storage devices provide several advantages to computing systems. For example, the remote storage devices 208 may provide far more storage capacity than may be possible with only local storage devices. As another example, the remote storage devices 208 may be more easily shared, because they may be accessed over the network 214. The remote storage devices 208 may be more easily accessed using the storage adapter device 312. For example, the host device 102 may communicate with the storage adapter device 312 using standard storage device drivers 106. As another example, the host device 102 may communicate with the storage adapter device 312 as if communicating with a local storage device. The storage adapter device 312 thus provides access to the remote storage devices 208 in a simple and robust manner.

II. Bridge Device for Remote Storage Servers

Figure 6:
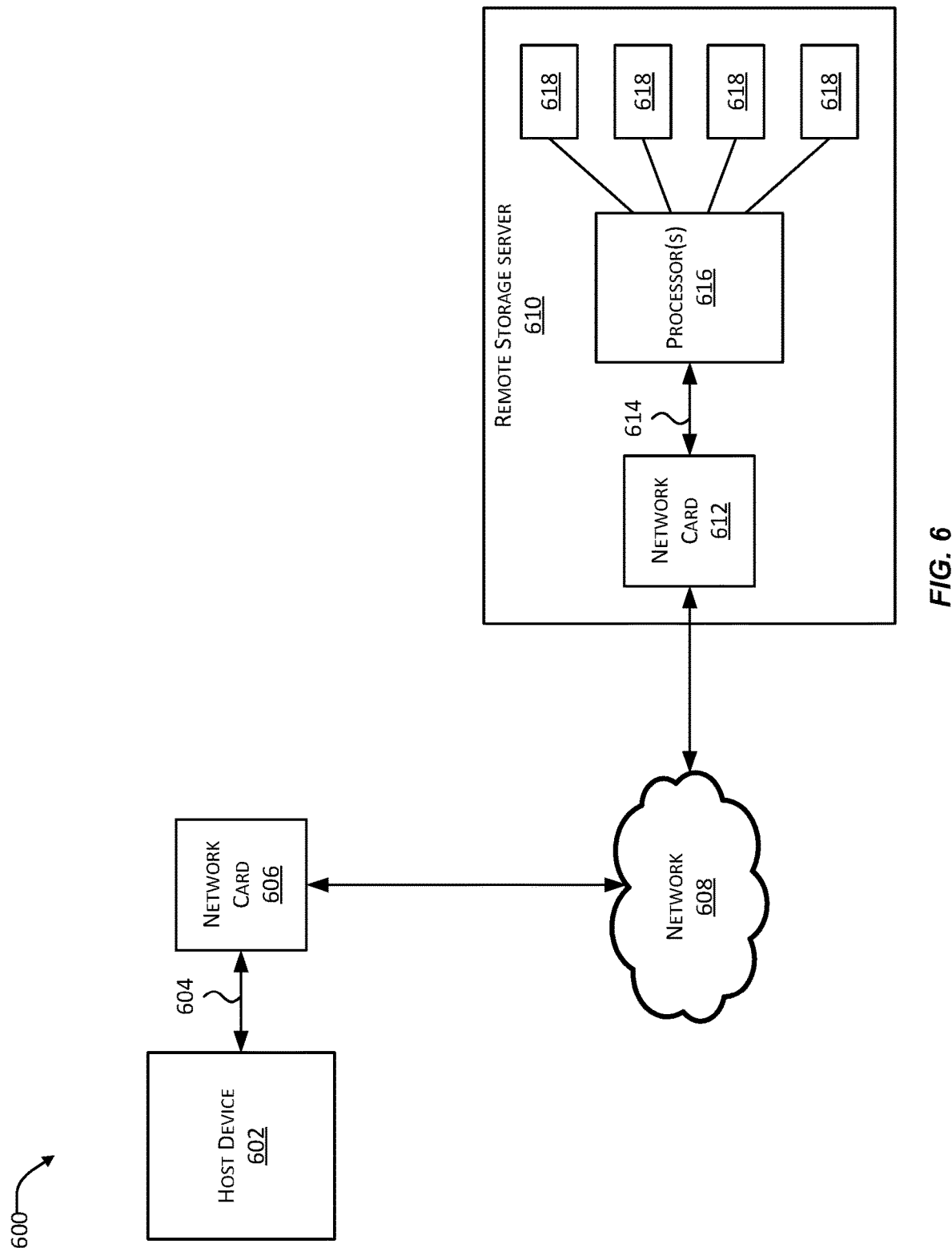
FIG. 6 illustrates an example of a computing system that includes a host device in communication with one or more remote storage devices included in a remote storage server.

FIG. 6 illustrates an example of a computing system 600 that includes a host device 602 in communication with one or more remote storage devices 618 included in a remote storage server 610. The host device 602 may communicate with the one or more storage devices 618 over a network 608. FIG. 6 illustrates on host device 602, but it is understood that may be host devices may be connected to the network 608, and that any of these host devices may be in communication with the remote storage server 610.

The host device 602 may be a computer, such as a server computer, a desktop computer, a laptop, a distributed computing system, or the like. The host device 602 may originate I/O transactions to peripheral devices, such as local storage devices. To transmit I/O transactions to the remote storage devices 618, the host device 602 may communicate with the network 608 using a network card 606. The network card 608 may communicate with the network 608 over a wired or wireless interface. The network card 608 may implement a network protocol and communicate with the network 608 using the network protocol. The network card 608 may also communicate with the host device 602 using a standardized bus protocol. For example, the network card 606 may include one or more interfaces that implement any of the PCI family of standard bus protocols.

The network card 606 may be connected to the host device 602 using a communication medium 604. The communication medium 604 may be a physical cable, a printed circuit board, or a combination of cables and circuit boards, connected to the host-side interface on the network card 606. The communication medium 604 may be standardized, and may implement the same standard that is implemented by the host-side interface on the network card 606. For example, the communication medium 604 may implement PCIe, and may include a PCIe slot attached to the host device 602.

In some implementations, the network 608 may be a private network. A private network is a network that may have private network addresses, be restricted or have no access to other networks, and/or may be limited to certain authorized uses. Private networks may be found, for example, in homes, offices, and enterprise networks. In other implementations, the network 608 may be a public network.

A public network may be shared by multiple entities, and may have no access restrictions, or minimal access restrictions. A public network may include the Internet. In other implementations, the network 608 may include a combination of public and private networks. In some implementations, the network 608 may include multiple networks, including for example the Internet. The network 608 may include other computing systems and network infrastructure devices, such as gateway devices, routers, switches, hubs, bridges, etc.

The remote storage server 610 may provide access and management for one or more storage devices 618. In some cases, the remote storage server 610 also houses the storage devices 618. In other cases, the storage devices 618 maybe be external to the remote storage server 610.

The remote storage server 610 may include a network card 612 for communicating with the network 608. In most cases, the network card 612 communicates with the network 608 using a network protocol, and/or a network storage protocol. Transactions received from the network 608 are typically formatted as network packets.

The network card 612 may be in communication with a processor or processor subsystem 616 over a communication medium 614. The communication medium 614 may provide a logical or physical connection for transferring transactions received by the network card 612 to the processor 616. The communication medium 614 may implement a standardized local bus protocol, such as for example PCIe.

The processor or processor subsystem 616 may be in communication with one or more storage devices 618. The storage devices 618 may be arranged as a storage array or disk array. In most cases, the processor 616 communicates with the storage devices 618 using a storage device protocol. Storage device protocols include bus protocols that may be understood by storage devices. In some implementations, storage device protocols are standardized, and include, for example NVMe, SCSI, SATA, PATA, and the like. In other implementations, storage device protocols are proprietary and/or customized. The processor 616 may provide translation of network packets received by the network card 612 to a storage device protocol. The processor 616 may further determine which of the storage devices 618 is to receive a translated transaction.

It should be noted that, in some implementations, the host device 602 can also communicate with the remote storage server 610 using the storage adapter device 312 illustrated in FIGS. 3-5. In these implementations, the host device 602 of FIG. 6 may communicate with the storage adapter device 312 in order to communicate with the network 608. Furthermore, the host device 602 may transmit transactions to the storage adapter device 312 as if transmitting transactions to a local storage device. The storage adapter device 312 may translate these transactions from a local bus protocol to a network protocol, and transmit the translated transactions over the network 608 to the remote storage server 610.

The computing system 600 illustrated in FIG. 6 may allow a host device 602 (or multiple host devices) to communicate with one or more remote storage devices 618 over a network. Providing access to the storage devices 618 may increase the storage space available to the host device 602. The storage devices 618 may also be easily shared among multiple host devices: the host devices only need a network connection and access privileges for the remote storage server 610.

A remote storage server 610 configured with a network card 612, however, may have some limitations. For example, the remote storage server 610 may require processors 616 to provide management and translation for storage devices 618. Implementing the remote storage server 610 with processors 616 may increase the cost and complexity of the remote storage server 610. It may be desirable to configure the remote storage server 610 in a simpler and more cost effective way. A storage bridge device may provide the management and translation that may make such a computing system possible.

Figure 7:
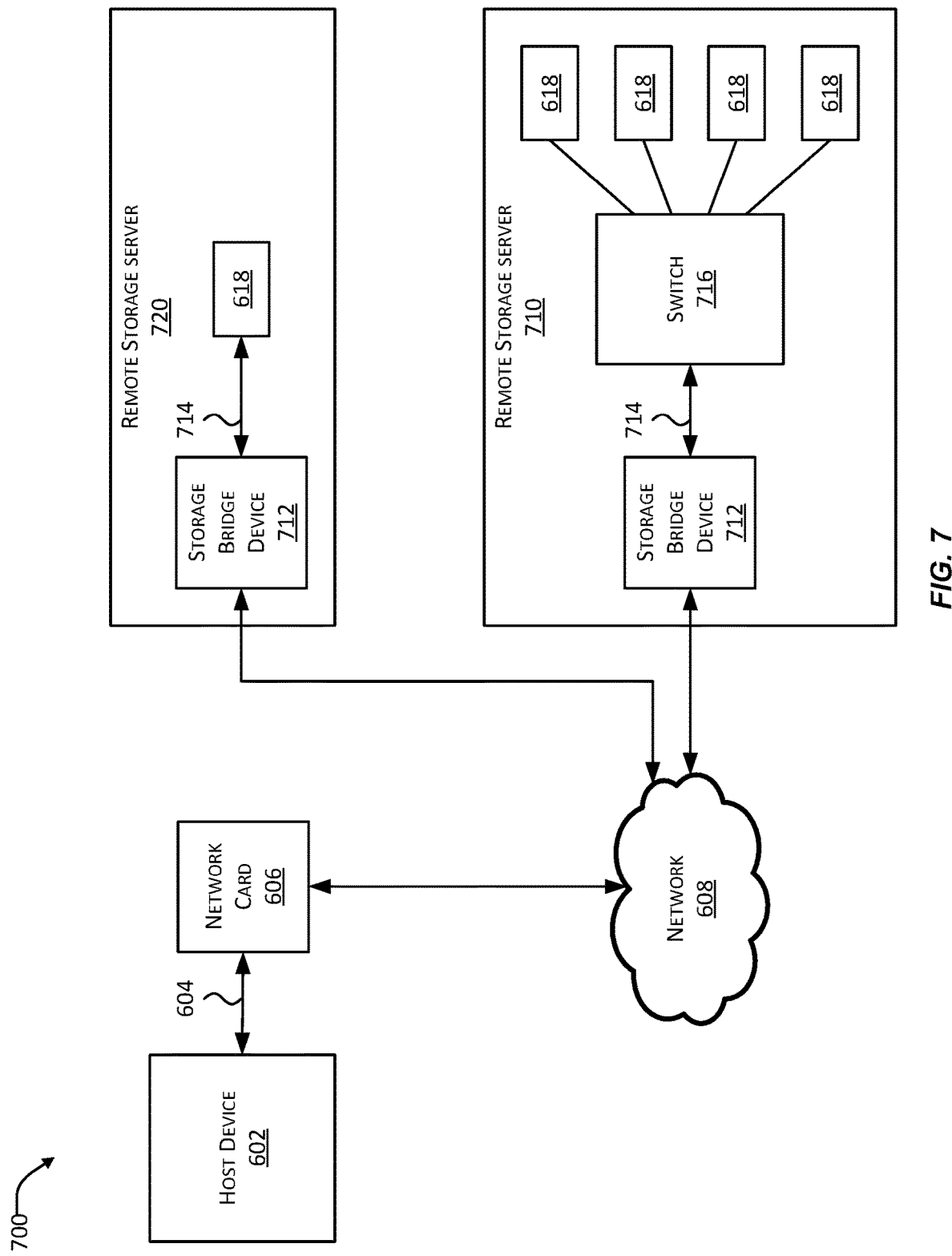
FIG. 7 illustrates an example of a computing system that includes examples of remote storage servers that include storage bridge devices.

FIG. 7 illustrates an example of a computing system 700 that includes examples of remote storage servers 710, 720 that include storage bridge devices 712. The computing system 700 in this example includes the host device 602, a network card 606, and network 608 described with respected to FIG. 6. FIG. 7 further includes examples of two remote storage servers 710, 720 that host remote storage devices 618 that may be accessed using storage bridge devices 712. FIG. 7 illustrates only one host device 602, but it is understood that many host devices may be connected to the network 608, and that any of these host devices may be in communication with the remote storage servers 710, 720. It should also be noted that, in some implementations, the host device 602 may communicate with the remote storage servers 710, 720 using the storage adapter device 312 described with respect to FIGS. 3-5. In these implementations, the host device 602 may communicate with the remote storage servers 710, 720 as if communicating with local storage devices.

In the example illustrated by FIG. 7, the host device 602 may communicate with one or more storage devices 618 over a network 608. The host device 602 may use a network card 606 to communicate with the network 608. The host device 602 may generate network transactions—that is, transactions formatted according a network protocol—that are directed to the remote storage servers 710, 720.

FIG. 7 provides two examples of remote storage servers 710. The first example remote storage server 710 includes a storage bridge device 712, a switch 716 module, and multiple storage devices 618. The storage bridge device 712 may be configured to communicate with the network 608. The storage bridge device 712 may receive network transactions that are directed to one or more of the storage devices 618. The storage bridge device 712 may translate network transactions from a network protocol and/or network storage protocol to a storage device protocol. The storage bridge device 712 is described in further detail below.

In the first remote storage server 710 example, the storage bridge device 712 is in communication with a switch device 716 over a communication medium 714. The switch device 716 is a hardware and/or software component configured to route transactions to and from multiple storage devices 618. The switch device 716 may also be described as a hub or routing type device. In some implementations, the switch device 716 is a PCI switch. In these implementations, the communications medium 714 is a PCI bus. In other implementations, the communications medium 714 implements the physical and logical aspects of a storage device protocol that is understood by both the storage bridge device 712 and the switch device 716.

The first remote storage server 710 example includes multiple storage devices 618. These storage devices 618 may be hard disks, including magnetic and solid state disks, optical disks, and/or tape drives. In some implementations, the remote storage devices 618 may be housed in the same chassis as the remote storage server 710. In other implementations, the remote storage devices 618 may be rack mounted external to the remote storage server 710.

The second example remote storage server 720 also includes a storage bridge device 712, and further includes one storage device 618. In this example remote storage server 720, the storage bridge device 712 may communicate directly with a storage device 618 over a communication medium 714. In some implementations, the storage bridge device 712 is configured identically to the storage bridge device 712 in the first remote storage server 710. In these implementations, the storage bridge device 712 may receive network transactions from the network 608 and translate these transactions to storage device protocol transactions. The storage bridge device 712 may further transmit those transactions directly to the storage device 618 attached to the remote storage server 720. In other implementations, the storage bridge device 712 in the second remote storage server 720 may be configured differently than the storage bridge device 712 in the first remote storage server 710. In these implementations, the storage bridge devices 712 may be configured for different storage device protocols, or may otherwise be configured according to the needs of their respective remote storage devices 710, 720.

The storage bridge devices 712 may provide more efficient access to storage resources provided by remote storage servers 710, 720. The storage bridge devices 712 may provide the translation that otherwise would be provided by more complicated and more expensive processors. Even greater efficiency may be achieved in implementations where the host device 602 is coupled to a storage adapter device—such as the storage adapter device discussed above—instead of a network card. In these implementations, the host device may communicate with storage resources provided by the remote storage servers 710, 720 as if accessing local storage resources. Furthermore, the storage bridge devices 712 may allow remote storage servers to be built without motherboards and other support systems that may be required by a processor.

In some implementations, the storage bridge devices 712 may also provide management of the storage devices 618 attached to their respective remote storage servers 710, 720. Management may include providing a representation of the storage resources provided by each remote storage server 710, 720. For example, in one implementation, the storage bridge device 712 in either remote storage server 710, 720 may represent all available storage resources as one logical disk. In these implementations, the host device 602 may be configured to map the addresses for one logical disk to one or the other remote storage servers 710. Alternatively or additionally, the storage bridge devices 712 may be configured to map namespaces and/or storage devices according to a network protocol. For example, requests received as TCP/IP packets may be directed to one namespace, while requests received as UDP/IP packets may be directed to another namespace. Alternatively or additionally, the mapping may be based on the TCP or UDP port on which a request is received. Alternatively or additionally, the mapping may be based on a queue pair that the request may be directed to, as would be the case with Infiniband and RoCe.

As another example, in one implementation, one of the storage devices 618 may be configured with multiple partitions. Partitions may also be referred to as namespaces. A partition or namespace is a logical division of one storage device. Each namespace may be treated as a separate logical disk, though the namespaces reside on the same physical disk. In these implementations, the storage bridge device 712 may represent the storage resources as multiple logical disks. For example, the one storage device 618 in the second remote storage server 720 may have, for example, four namespaces. In this example, the storage bridge device 712 may represent each of those four namespaces as a separate logical disk. The host device 602 may further be configured to access four logical disks, where each of those four logical disks are mapped to one of the four namespaces represented by the storage bridge device 712. One or more of the storage devices in the first remote storage device 710 may also have multiple namespaces, which may also be represented by the storage bridge device 712 as multiple logical disks.

As another example, in one implementation, one or more of the multiple storage devices 618 in the second remote storage server 720 may be represented as one logical disk. In these implementations, the storage bridge device 712 may represent the remote storage server 720 as having one or more logical disks. The host device 602 may further be configured to map the addresses for one logical disk to one of these disks.

As one more example, in one implementation, some or all of the storage resources provided by both remote storage devices 710, 720 (or additional remote storage devices not illustrated here) may be represented as one logical disk. For example, a portion of the storage device 618 in the second remote storage server 720 and two of the storage devices 618 in the first remote storage server 710 may be represented as one logical disk. The host device 602 may further be configured to use this one logical disk as if accessing one local disk.

In various implementations, one request from the host device 602 may be directed to more than one location on one storage device 618 and/or to more than one storage device 618. For example, in some implementations, before or after translation, a request may be duplicated. The duplicate requests may be directed to different locations on the same storage device 618. For example, the duplicate requests may be directed to different namespaces. A remote storage server may be configured this way, for example, to maintain redundant copies of data. Redundant copies of data may provide a data recovery mechanism, should a storage device 618 fail. In some implementations, one storage device 618 or an array of storage devices 618 may be configured as a redundant array of independent disks (RAID). The request may be mirrored and/or striped across one or more of the storage devices 618 included in the RAID array. In some implementations, a request from the host device 602 may be directed to multiple storage devices 618. In these implementations, the storage bridge device 712 may generate multiple translated requests, where each translated request is addressed to a different storage device 618. This may be done for redundancy, and/or because multiple storage devices 618 are providing the same data.

In some implementations, the storage bridge device 712 may be configured to transmit a request over the network 608 to another remote storage server. The storage bridge device 712 may transmit the request to another remote storage server in addition to, or instead of, processing the request and directing the request to storage devices 618 attached to its own remote storage server. The remote storage server that receives the request from the storage bridge device 712 may process the request just as if the request was received from a host device 602.

As illustrated by the above examples, the storage resources provided by the remote storage servers 710, 720 may, in some implementations, be cooperatively managed. Alternatively, some implementations may provide centralized management of the logical disks represented by each storage bridge device 712 for each remote storage server 710, 720, as well as assignment of logical disks to the host device 602, or other host devices. In either of these implementations, a management server (not illustrated) may be provided. Alternatively a group of servers may be provided to provide redundancy, in case any of the servers fail. The management server may have sufficient access privileges to configure and manage the remote storage servers 710, 720 and the host device 602. The management server may configure the arrangement of the logical disks represented at each remote storage server 710, 720. The management server may further assign one or more of these logical disks to the host device 602. In most cases, the host device 602 may be unaware that it has been assigned storage space provided by the remote storage servers 710, 720. In these cases, the host device 602 may be configured to treat its assigned disks as if accessing local storage resources.

In some implementations, the storage devices 618 may be configured to indicate to a requesting host device the status of a request received by one or more of the storage devices 618. For example, when a request completes successfully, a storage device 618 may generate a response that indicates a successful completion. This response may be formatted according to a storage device protocol, and may be received by the storage bridge device 712. The storage bridge device 712 may translate the response to a network protocol, and transmit the translated response over the network 608 to the host device 602. In some cases, the storage devices 618 may alternatively or additionally be configured to indicate to a requesting host device that a request did not complete successfully. In these cases, a storage device 618 may generate a response that includes information about how and/or why the request did not complete successfully. This type of response may also be received by the storage bridge device 712 for translation and transmission over the network to the host device 102.

Figure 8:
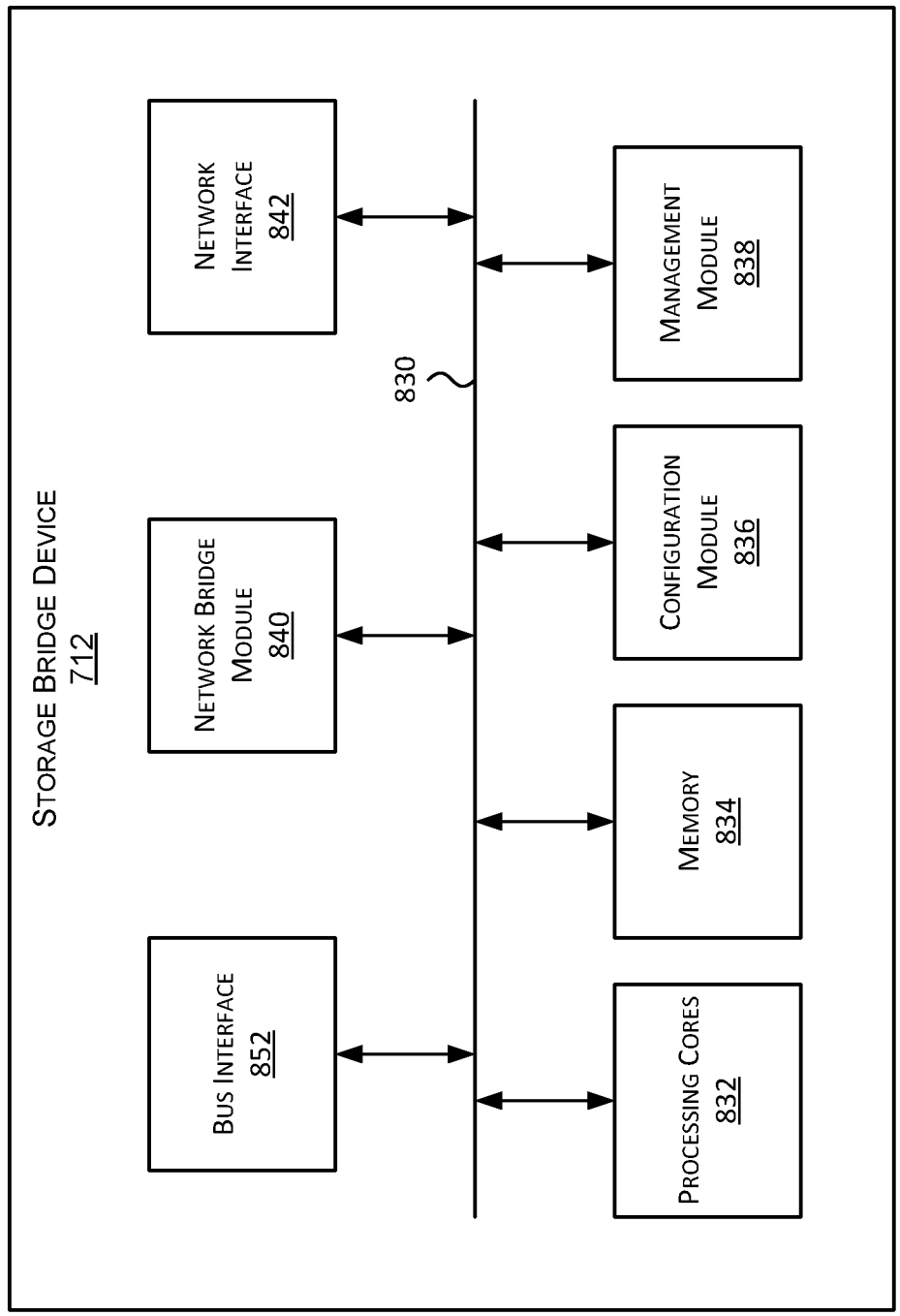
FIG. 8 illustrates in greater detail an example of the storage bridge device.

FIG. 8 illustrates in greater detail an example of the storage bridge device 712. In this example, the storage bridge device 712 may include processing cores 832, memory 834, a configuration module 836, a management module 838, a network interface module 842, a bus interface module 852, and a network bridge module 840. These modules may be hardware modules, software modules, or a combination of hardware and software. The storage bridge device 712 may include additional modules, not illustrated here. In some implementations, the storage bridge device 712 may include fewer modules.

One or more of the modules may be in communication with each other over a communication channel 830. The communication channel 830 may include one or more busses, meshes, matrices, fabrics, a combination of these communication channels, or some other suitable communication channel.

The processing cores 832 may include one or more processors configured to execute instructions. In some implementations, the processors of the processing cores 832 may share certain resources, such as for example busses, level 1 (L1) caches, and/or level 2 (L2) caches. The instructions executed by the processing cores 832 may be stored on a computer-readable storage medium, for example, in the form of a computer program. The computer-readable storage medium may be non-transitory. In some cases, the computer readable medium may be part of the memory 834.

The memory 834 may include either volatile or non-volatile, or both volatile and non-volatile types of memory. In some cases, some or all of the memory 834 may be internal to the storage bridge device 712, while in other cases some or all of the memory may be external to the storage bridge device 712.

The configuration module 836 may include one or more configuration registers. Configuration registers may control the operations of the storage bridge device 712. In some implementations, one or more bits in the configuration register can represent certain capabilities of the storage bridge device 712. Configuration registers may be programmed by instructions executing in the processing cores 832, and/or by an external entity. The configuration module 836 may further include hardware and/or software that control the operations of the storage bridge device 712.

In some implementations, the management module 838 may be configured to manage different components of the storage bridge device 712. In some cases, the management module 838 may configure one or more bits in one or more configuration registers at power up, to enable or disable certain capabilities of the storage bridge device 712.

The network interface 842 may include hardware and/or software for communicating with a network. This network interface 842 may, for example, include physical connectors for a wired connection to the network, and/or antennas for wireless communication with the network. The network interface 842 may further include hardware and/or software configured to implement a network protocol stack. The network interface 842 may communicate with the network using a network protocol and/or a network storage protocol.

In some implementations, the storage bridge device 712 may include multiple network interfaces. In these implementations, each network interface may be in communication with a different network. For example, one network interface may be in communication with an Ethernet-based network, while another network interface may be in communication with a cellular-based network. In some implementations, the storage bridge device 712 may be configured such that each network interface only has access to some storage devices, and/or specified namespaces. In other implementations, each network interface may have access to any storage device and/or namespace.

The bus interface 852 module may enable communication with one or more storage devices. The bus interface 852 module may include a physical interface for connecting to a cable, socket, port, or other connection to a storage device or, in some implementations, a switch or hub type device. The bus interface 852 module may further include hardware and/or software to manage incoming and outgoing transactions. The bus interface 852 module may implement a storage device protocol, such as NVMe, AHCI, SCSI, SAS, SATA, PATA, and the like. The bus interface 852 module may include at least the physical layer for any of these bus protocols, including a connector, power management, error handling, etc.

The network bridge module 840 may be configured to communicate between one or more network-connected host devices and one or more storage devices. The network bridge module 840 may provide, to the host devices, access to the storage devices. The network bridge module 840 is described in further detail below.

In some implementations, the storage bridge device 712 is a PCI device. In these implementations, the storage bridge device 712 includes a PCI interface for communicating with storage devices and other PCI devices.

Figure 9:
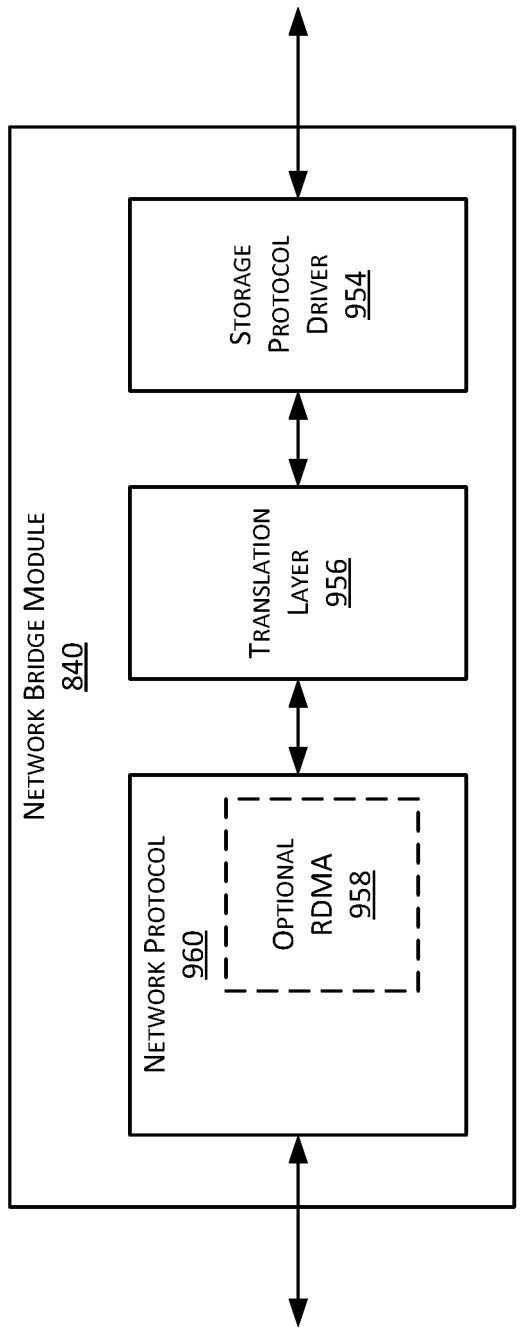
FIG. 9 illustrates, in greater detail, an example of a network bridge module.

As noted above, the storage bridge device 712 may include a network bridge module 840. FIG. 9 illustrates, in greater detail, an example of a network bridge module 840. As illustrated in FIG. 9, the network bridge module 840 may include a network protocol 960 module, an optional RDMA 958 module, a translation layer 956 module, and a storage protocol driver 954 module. Each of these modules may be implemented in hardware or software, or in a combination of hardware and software. In some implementations, two or more of the illustrated modules may be combined into one module.

The network protocol 960 module may enable communication with a network. The network protocol 960 module may implement a network protocol and/or a network storage protocol. The network protocol 960 module may include one or more network protocol layers, including for example one or more of an application layer, a presentation layer, a session layer, a transport layer, a network layer, a data link layer, and/or a physical layer. The network protocol 960 module may receive a packet from the network and may decompose the packet into data that represents an I/O transaction from a host device. This data may be passed to the translation layer 956 module for translation into an I/O request. In some implementations, the translation layer 956 module may also pass translated responses to the network protocol 960 module. A translated response may indicate the status of a request from a host device. The translated response may indicate that the request completed successfully, or that the request terminated with an error.

In some implementations, the network bridge module 840 may also include a RDMA 958 module. RDMA provides a computing system the ability to access memory on a remote computing system without interrupting any processors on the remote system. Applications executing on a host device may access remote memory without consuming any processor time on the remote system. The RDMA 958 module illustrated in FIG. 9 is on the remote side of a transaction initiated by a host device. The RDMA 958 module may assist in providing access to remote memory, which here are embodied in the storage devices 618 hosted by a remote storage server.

The translation layer 956 module may include hardware and/or software for translating transactions from network protocol 960 module into a storage device transactions. For example, the translation layer 956 module may translate from the network protocol implemented by the network protocol 960 module to a storage device protocol that can be understood by storage devices. This translation may include unpacking data received from the network protocol 960 module into its constituent parts (e.g., a transaction type, transaction data, byte enables, etc.) and generating a new transaction using the parts and formatted according to the storage device protocol. In some implementations, the translation layer 956 module may also translate responses from the storage devices from a storage device protocol to the network protocol. This translation may include unpacking the response into its constituent parts and repacking the constituent parts into a translated response that is formatted according to the network protocol. The translated response may be passed to the network protocol 960 module for transmission over the network.

The storage protocol driver 954 module may include software and/or hardware to implement the higher level operations of a storage device protocol. For example, the storage protocol driver 954 module may perform operations such as formatting the basic parts of an incoming transaction (e.g., the address, data, transaction attributes, etc.) into the format defined by a storage device protocol. The storage protocol driver 954 module may also receive responses from storage devices, indicating the status of a transaction. The storage protocol driver 954 module may also conduct other operations, such as error checking and data validation.

As explained above, the network bridge module 840, as part of a storage bridge device 712, may provide connectivity between network-connected host devices and storage devices hosted by a remote storage server. The network bridge module 840 may provide translation of network transactions into storage device transactions. Using the network bridge module 840, a storage bridge device 712 may simplify the building and management of remote storage servers.

III. Methods

Figure 10:
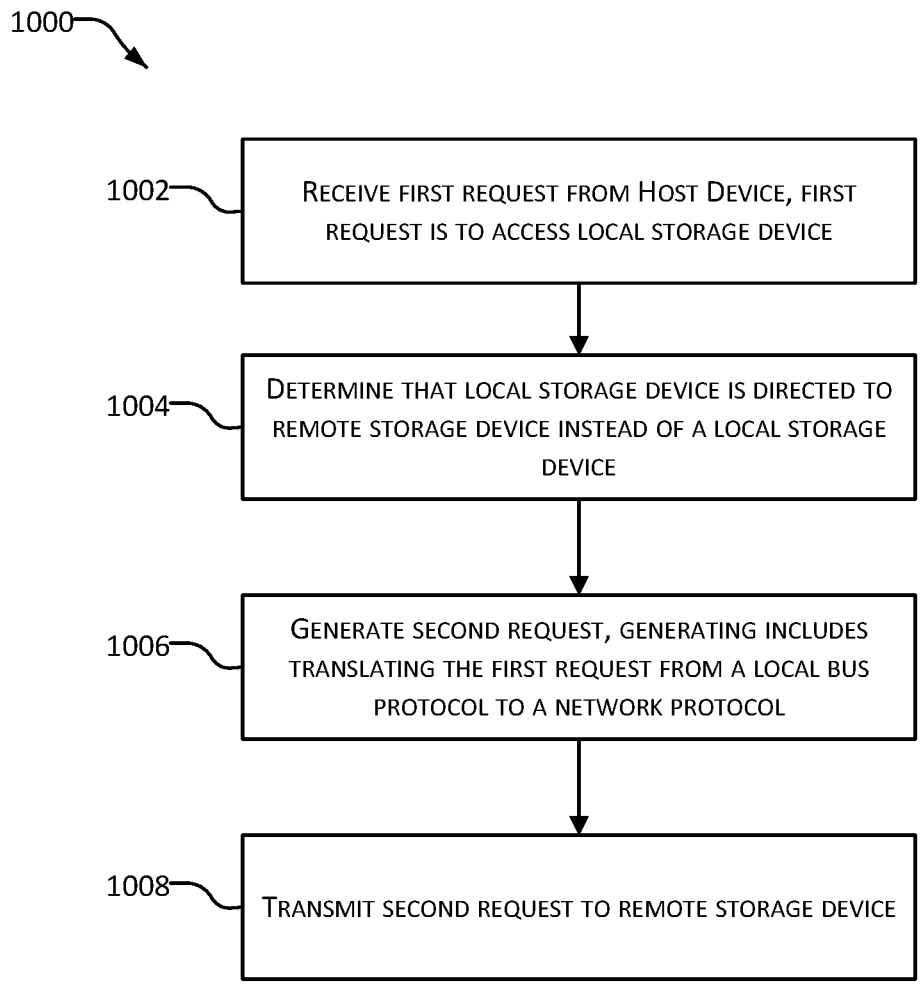
FIG. 10 illustrates one example of a process for transmitting I/O requests to a remote storage device.
Figure 11:
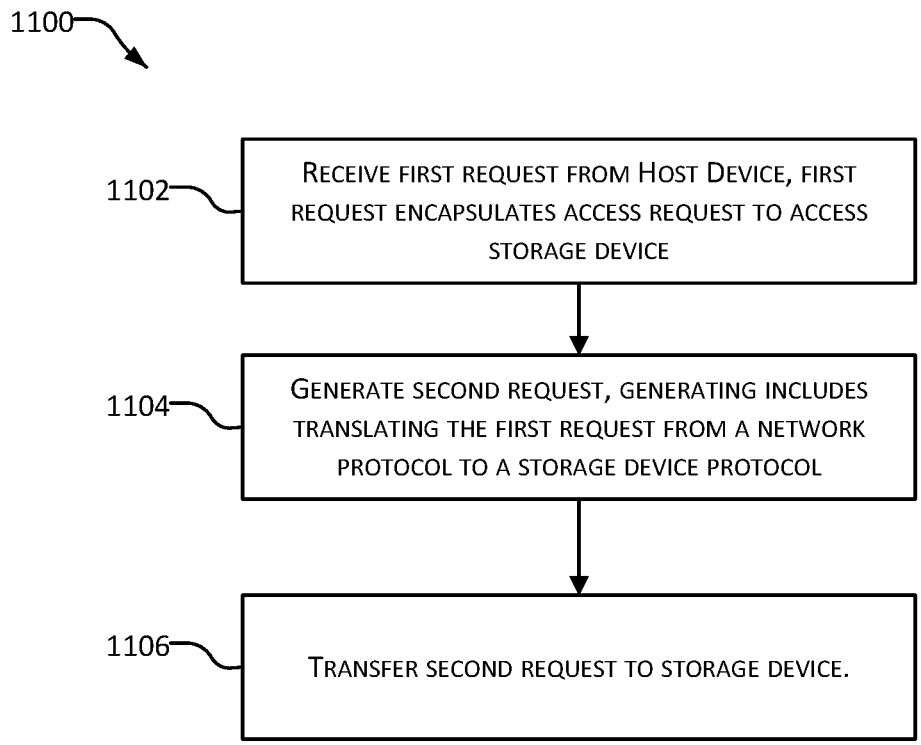
FIG. 11 illustrates an example of a process for receiving network transactions from a host device that are directed to storage devices.

FIGS. 10-11 illustrate examples of a methods for transmitting an I/O transactions from a host device to a remote storage devices. These methods may be implemented by the systems described above, such as for example the computing systems of FIGS. 3 and 7.

FIG. 10 illustrates one example of a process 1000 for transmitting I/O requests to a remote storage device. The process 1000 may be executed by a storage adapter device, such as for example the storage adapter device 312 illustrated in FIGS. 3-5.

At step 1002 of FIG. 10, the storage adapter device may receive a first request from a host device. This first request may be a request to access a local storage device. This first request may be, for example, a request to read data from a storage device, or a request to write data to a storage device. The host device may be similar to the host device 102 described with respect to FIG. 1. The host device may be communicatively coupled to the storage adapter device. The host device may further communicate with the storage adapter device using a local bus protocol. For example, the host device may communicate with the storage adapter device using NVMe, AHCI, SCSI, SAS, SATA, PATA, or the like.

At step 1004 of FIG. 10, the storage adapter device may determine that the first request is directed to a remote storage device, rather than a local storage device. That is, though the host device targeted the first request at a local storage device, the storage adapter device may determine that the first request should, instead, be directed to a remote storage device. The storage adapter device may make this determination in one or more of several ways. For example, the first request may include an address, and the storage adapter device may include an address map that indicates addresses that are located on the remote storage device. As another example, the storage adapter device may examine bits of an address included in the first request that indicate that the first request is directed to the remote storage device. As yet another example, the first request may include transaction attributes that indicate that the first request is directed to the remote storage device.

Additionally, in some cases, the storage adapter device may be in communication with multiple remote storage devices. In these cases, the storage adapter device may select the remote storage device from among the multiple remote storage devices. This selection may also be based on an address map, stored as a table, list, database, or some other method, that indicates the mapping of local storage device addresses to remote storage devices addresses. For example, the mapping may indicate that all of the addresses for one local storage device are mapped to one of multiple remote storage devices. Alternatively or additionally, the mapping may indicate that the addresses for one local storage device are mapped to one namespace or partition on a remote storage device. Alternatively or additionally, the mapping may indicate that portions of the addresses for one local storage device are spread among multiple remote storage devices. Also alternatively or additionally, some or all of the addresses for one local storage device may be mapped to more than one remote storage device.

The one or more remote storage devices may be communicatively coupled to the storage adapter device over a network. The storage adapter device may further communicate with the remote storage device using a network protocol. For example, the storage adapter device may include an interface that implements TCP/IP, UDP/IP, Infiniband, RoCE, IEEE 802.11, or the like. Alternatively or additionally, the storage adapter device may communicate with the remote storage device using a network storage protocol, such as for example iSCSI, iSER, SRP, and/or NVMf, among others.

At step 1006, the host device may generate a second request. Generating the second request may include translating the first request from the local bus protocol to the network protocol and/or network storage protocol. For example, the storage adapter device may include a translation module that implements iSCSI, iSER, SRP, or the like. As another example, the storage adapter device may include hardware and/or software that unpacks the first request into basic components (such as an address and data) and repacks the basic components into a packet. The second request may further include this packet.

At step 1008, the storage adapter device may transmit the second request to the remote storage device. The storage adapter device may, for example, transmit a network packet including the second request. The network packet may be addressed to the remote storage device, and/or a computing system that is hosting the remote storage device.

The storage adapter device may further receive a response from the remote storage device. For example, the remote storage device may transmit an acknowledgement to indicate that a write transaction completed successfully. As another example, the remote storage device may transmit one or more data segments in response to a read request. As yet another example, the remote storage device may transmit an error to indicate that there was a problem with completing the second request.

FIG. 11 illustrates an example of a process 1100 for receiving network transactions from a host device that are directed to storage devices. The process 1100 may be executed by a storage bridge device, such as for example the storage bridge device 712 illustrated in FIGS. 7-9.

At step 1102 of FIG. 11, the storage bridge device may receive a first request from a host device. The first request may be include a request to access a storage device. Furthermore, the host device may be communicating with the storage bridge device over a network, using a network protocol. The first request may thus be formatted according to a network protocol.

In some implementations, at step 1106, the storage bridge device may transmit the first request over the network to another remote storage server. The storage bridge device may transmit the request in addition to, or instead of, executing the steps that follow. The remote storage server that receives a request transmitted in this way may process the request as if the request was received from a host device.

At step 1104, the storage bridge device may generate a second request. Generating the second request may include translating the first request from a network protocol to a storage device protocol. For example, the storage bridge device may translate a TCP/IP packet into a transaction formatted according to one of the NVMe, SCSI, SAS, SATA, or PATA protocols.

At step 1106, the storage bridge device may transfer the second request to a storage device. This step may include determining which of multiple namespaces is to receive the second request. The storage device may include multiple namespaces, and the storage adapter device may include a directory mapping storage addresses to namespaces. Alternatively or additionally, this step may include determining which of multiple storage devices is to receive the second request. The storage bridge device may be able to access multiple storage devices, and may further include a directory that maps storage addresses to the multiple storage devices.

In some implementations, at step 1106, the storage bridge device may also direct the second request to more than one storage device, such that each storage device receives and processes the second request. In some implementations, the storage bridge device may alternatively or additionally duplicate the second request, and transfer each duplicate to different locations on the same storage device. In some implementations, one or more storage device may be configured into a RAID array. In these implementations, the storage bridge device may mirror and/or stripe the second request across one or more namespaces, and/or one or more storage devices in the RAID array.

The storage bridge device may further receive one or more responses from the storage device or devices that received the transaction transferred at step 1106. The one or more responses may indicate the status of the transaction, such as for example indicating that the transaction completed successfully or that the transaction could not complete. In the latter case, the responses may indicate how and/or why the transaction did not complete.

IV. Computing Systems

Figure 12:
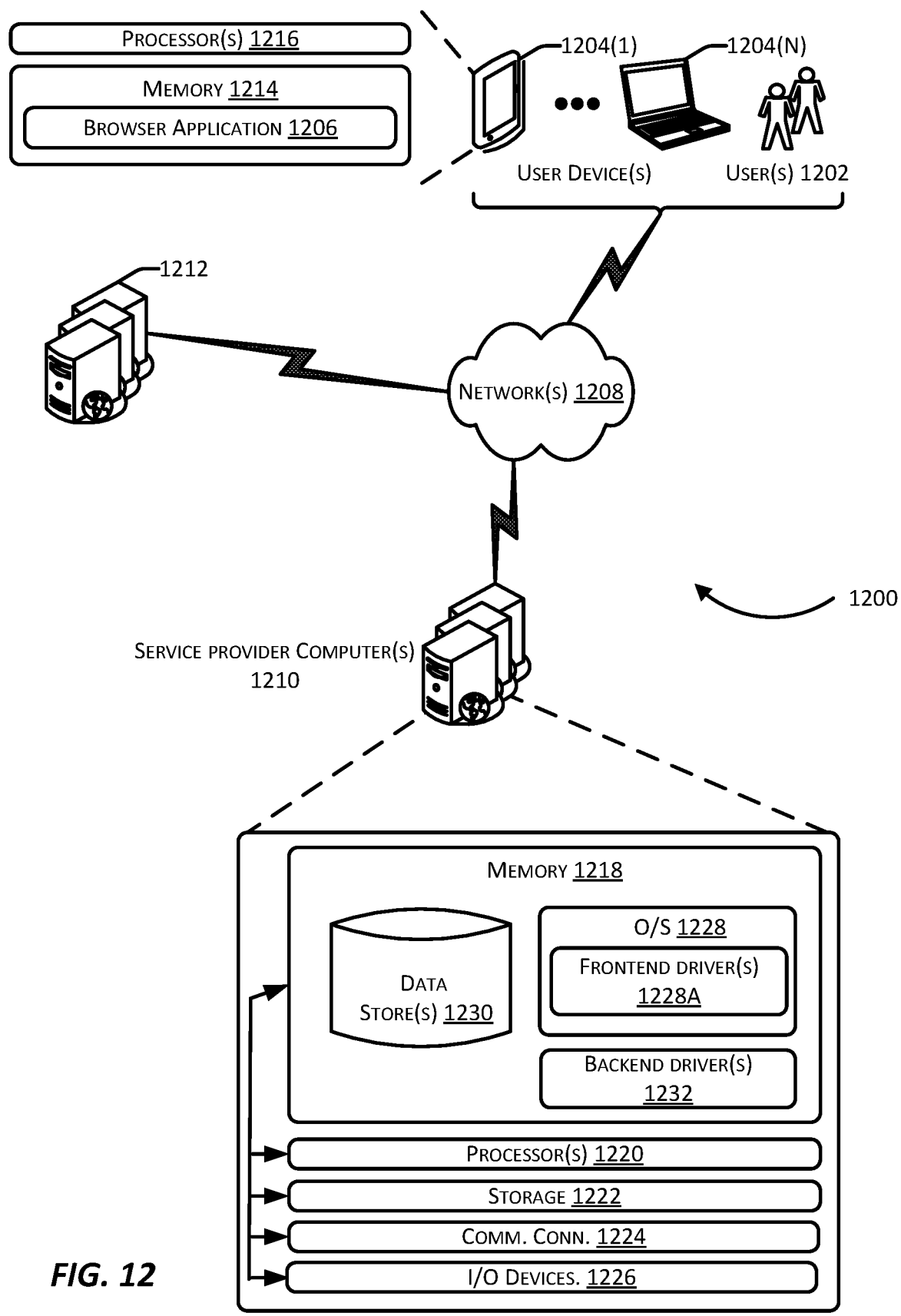
FIG. 12 illustrates an example architecture for features and systems described herein that includes one or more service provider computers and/or a user device connected via one or more networks, according to some embodiments.

FIG. 12 illustrates an exemplary architecture for features and systems described herein that includes one or more service provider computers and/or a user device connected via one or more networks, according to at least one exemplary embodiment. The devices discussed in FIGS. 3-4, may use one or more components of the computing devices described in FIG. 12 or may represent one or more computing devices described in FIG. 12. In architecture 1200, one or more users 1202 may utilize user computing devices 1204(1)-(N) (collectively, user devices 1204) to access application 1206 (e.g., a web browser or mobile device application), via one or more networks 1208. In some aspects, application 1206 may be hosted, managed and/or provided by a computing resources service or service provider. One or more service provider computers 1210 may provide a native application which is configured to run on user devices 1204 which user(s) 1202 may interact with. Service provider computer(s) 1210 may, in some examples, provide computing resources such as, but not limited to, client entities, low latency data storage, durable data storage, data access, management, virtualization, cloud-based software solutions, electronic content performance management, etc. Service provider computer(s) 1210 may also be operable to provide web hosting, computer application development and/or implementation platforms, combinations of the foregoing or the like to user(s) 1202. Service provider computer(s) 1210, in some examples, may communicate with one or more third party computers 1212.

In some examples, network(s) 1208 may include any one or a combination of many different types of networks, such as cable networks, the Internet, wireless networks, cellular networks and other private and/or public networks. While the illustrated example represents user(s) 1202 accessing application 1206 over network(s) 1208, the described techniques may equally apply in instances where user(s) 1202 interact with service provider computer(s) 1210 via user device(s) 1204 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1206 may allow user(s) 1202 to interact with service provider computer(s) 1210 such as to access web content (e.g., web pages, music, video, etc.). Service provider computer(s) 1210, perhaps arranged in a cluster of servers or as a server farm, may host application 1206 and/or cloud-based software services. Other server architectures may also be used to host application 1206. Application 1206 may be capable of handling requests from many users 1202 and serving, in response, various item web pages. Application 1206 can provide any type of website that supports user interaction, including social networking sites, online retailers, informational sites, blog sites, search engine sites, news and entertainment sites and so forth. As discussed above, the described techniques can similarly be implemented outside of application 1206, such as with other applications running on user device(s) 1204.

User device(s) 1204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1204 may be in communication with service provider computer(s) 1210 via network(s) 1208, or via other network connections. Additionally, user device(s) 1204 may be part of the distributed system managed by, controlled by or otherwise part of service provider computer(s) 1210 (e.g., a console device integrated with service provider computers 1210).

In one illustrative configuration, user device(s) 1204 may include at least one memory 1214 and one or more processing units (or processor(s)) 1216. Processor(s) 1216 may be implemented as appropriate in hardware, computer-executable instructions, firmware, or combinations thereof. Computer-executable instruction or firmware implementations of processor(s) 1216 may include computer-executable or machine-executable instructions written in any suitable programming language to perform the various functions described. User device(s) 1204 may also include geo-location devices (e.g., a global positioning system (GPS) device or the like) for providing and/or recording geographic location information associated with user device(s) 1204.

Memory 1214 may store program instructions that are loadable and executable on processor(s) 1216, as well as data generated during the execution of these programs. Depending on the configuration and type of user device(s) 1204, memory 1214 may be volatile (such as random access memory (RAM)) and/or non-volatile (such as read-only memory (ROM), flash memory, etc.). User device(s) 1204 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1214 may include multiple different types of memory, such as static random access memory (SRAM), dynamic random access memory (DRAM), or ROM.

Turning to the contents of memory 1214 in more detail, memory 1214 may include an operating system and one or more application programs or services for implementing the features disclosed herein including at least a user provided input element or electronic service web page, such as via browser application 1206 or dedicated applications (e.g., smart phone applications, tablet applications, etc.). Browser application 1206 may be configured to receive, store and/or display a website or other interface for interacting with service provider computer(s) 1210. Additionally, memory 1214 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1204.

In some aspects, service provider computer(s) 1210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1210 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1210 may be in communication with user device(s) 1204 and/or other service providers via network(s) 1208, or via other network connections. Service provider computer(s) 1210 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1210 may include at least one memory 1218 and one or more processing units (or processor(s)) 1220. Processor(s) 1220 may be implemented as appropriate in hardware, computer-executable instructions, firmware or combinations thereof. Computer-executable instruction or firmware implementations of processor(s) 1220 may include computer-executable or machine-executable instructions written in any suitable programming language to perform the various functions described.

In some instances, hardware processor(s) 1220 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1218 may store program instructions that are loadable and executable on processor(s) 1220, as well as data generated during the execution of these programs. Depending on the configuration and type of service provider computer(s) 1210, memory 1218 may be volatile (such as RAM) and/or non-volatile (such as ROM, flash memory, etc.). Service provider computer(s) 1210 or servers may also include additional storage 1222, which may include removable storage and/or non-removable storage. The additional storage 1222 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1218 may include multiple different types of memory, such as SRAM, DRAM, or ROM.

Memory 1218, the additional storage 1222, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1218 and the additional storage 1222 are all examples of computer storage media. Additional types of computer storage media that may be present in service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1210. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1210 may also contain communications connection(s) 1224 that allow service provider computer(s) 1210 to communicate with a stored database, another computing device or server, user terminals and/or other devices on network(s) 1208. Service provider computer(s) 1210 may also include I/O device(s) 1226, such as a keyboard, a mouse, a pen, a voice input device, a touch input device, a display, speakers, a printer and the like.

Memory 1218 may include an operating system 1228, one or more data stores 1230 and/or one or more application programs or services for implementing the features disclosed herein. The operating system 1228 may include one or more frontend drivers 1228A. In some implementations, the memory 1218 may include one or more backend drivers 1232. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

Figure 13:
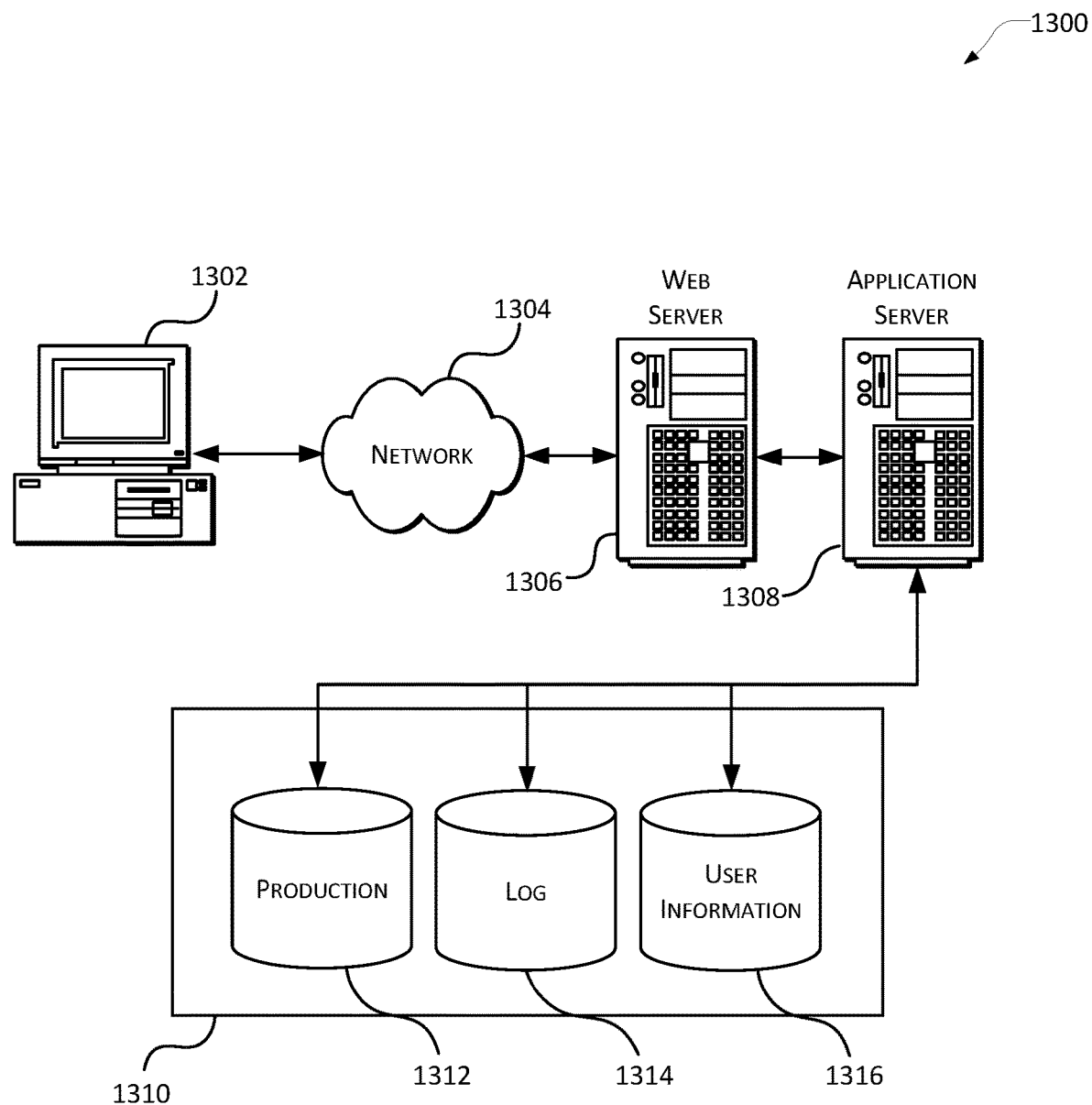
FIG. 13 illustrates aspects of an example environment of a computing system for implementing aspects in accordance with some embodiments.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A storage adapter device, comprising:
a first interface operable to communicate with a storage device driver; and
a second interface operable to communicate with a network, the network including remote storage devices;
wherein the storage adapter device is operable to:
receive, at the first interface, a request for reading or writing data of a storage device, wherein the request is associated with a virtual machine executing on a host device, and wherein the request includes the data and a local virtual address for reading or writing the data;
determine that the request is directed to at least one remote storage device on the network, wherein the storage adapter device is capable of determining that a given request is directed to a plurality of remote storage devices;
determine, using an address map stored on the storage adapter device, at least one remote address on the at least one remote storage device that corresponds to the local virtual address of the request,
wherein the address map includes a first plurality of remote addresses on respective remote storage devices that map to a same local virtual address, and a second plurality of remote addresses on respective remote storage devices that each map to a different local virtual address;
for each remote storage device of the at least one remote storage device:
generate a packet including the request and the corresponding remote address for the remote storage device; and
transmit the packet using the second interface, wherein, when the remote storage device receives the packet, the remote storage device accesses the corresponding remote address to write the data to the corresponding remote address or read the data from the corresponding remote address.

2. The storage adapter device of claim 1, wherein each of a plurality of virtual machines executing on the host device is associated with a different virtual function from a plurality of virtual functions implemented by a storage protocol driver of the first interface.

3. The storage adapter device of claim 2, wherein the plurality of virtual functions represent the remote storage devices to each of the plurality of virtual machines as a local storage device.

4. The storage adapter device of claim 1, wherein the second interface is implemented as a physical function associated with a virtual function.

5. The storage adapter device of claim 1, wherein the second interface further includes a Remote Direct Memory Access (RDMA) module, and wherein the storage adapter device is further operable to:
generate an RDMA transaction for the request, wherein the RDMA module manages transfer of data associated with the request, and wherein, while the RDMA module manages the transfer, the storage adapter device is available to receive additional requests.

6. The storage adapter device of claim 1, wherein the first interface implements one of Peripheral Component Interconnect Express (PCIe), Small Computer System Interface (SCSI), Serial Attached SCSI (SAS), Serial Advanced Technology Attachment (SATA), or Parallel Advanced Technology Attachment (PATA).

7. The storage adapter device of claim 1, wherein the second interface implements one of Transmission Control Protocol/Internet Protocol (TCP/IP), User Datagram Protocol/Internet Protocol (UDP/IP), Infiniband, Internet Small Computer System Interface (iSCSI) protocol, NVMe (Non-Volatile Memory Express) over fabric (NVMf), Remote Direct Memory Access (RDMA) over Converged Ethernet (RoCE), or Storage RDMA Protocol (SRP).

8. A computer-implemented method performed by a storage adapter device, comprising:
    receiving a request for reading or writing data of a storage device associated with a virtual machine executing on a host device, wherein the request includes the data and a local virtual address for reading or writing the data, wherein the host device includes a first interface operable to communicate with a storage device driver;
    determining that the request is directed to at least one remote storage device on a network, wherein the storage adapter device is capable of determining that a given request is directed to a plurality of remote storage devices;
    determining, using an address map stored on the storage adapter device, at least one remote address on the at least one remote storage device that corresponds to the local virtual address of the request,
    wherein the address map includes a first plurality of remote addresses on respective remote storage devices that map to a same local virtual address, and a second plurality of remote addresses on respective remote storage devices that each map to a different local virtual address;
    for each remote storage device of the at least one remote storage device:
        generating a packet including the request and the corresponding remote address for the remote storage device; and
        transmitting the packet using a second interface, wherein the second interface is operable to communicate with the network, wherein, when the remote storage device receives the packet, the remote storage device accesses the corresponding remote address to write the data to the corresponding remote address or read the data from the corresponding remote address.

9. The computer-implemented method of claim 8, wherein each of a plurality of virtual machines executing on the host device is associated with a different virtual function from a plurality of virtual functions implemented by a storage protocol driver of the first interface.

10. The computer-implemented method of claim 9, wherein the plurality of virtual functions represent the remote storage device to each of the plurality of virtual machines as a local storage device.

11. The computer-implemented method of claim 8, wherein the second interface is implemented as a physical function associated with a virtual function.

12. The computer-implemented method of claim 8, wherein the second interface further includes a Remote Direct Memory Access (RDMA) module, and wherein the computer-implemented method further comprises:
    generating an RDMA transaction for the request, wherein the RDMA module manages transfer of data associated with the request, and wherein, while the RDMA module manages the transfer, the remote storage device is available to receive additional requests.

* * * * *